US012633637B2

(12) United States Patent
Kawaguchi

(10) Patent No.: US 12,633,637 B2
(45) Date of Patent: May 19, 2026

(54) TRANSMISSION LINE, PROCESSING DEVICE, AND QUANTUM COMPUTER

(71) Applicant: KABUSHIKI KAISHA TOSHIBA, Tokyo (JP)

(72) Inventor: Tamio Kawaguchi, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 182 days.

(21) Appl. No.: 18/675,619

(22) Filed: May 28, 2024

(65) Prior Publication Data

US 2025/0183508 A1 Jun. 5, 2025

(30) Foreign Application Priority Data

Nov. 30, 2023 (JP) ................................ 2023-203103

(51) Int. Cl.
*H01P 3/08* (2006.01)

(52) U.S. Cl.
CPC .................................. *H01P 3/081* (2013.01)

(58) Field of Classification Search
CPC ...................................................... H01P 3/081
See application file for complete search history.

(56) References Cited

U.S. PATENT DOCUMENTS 6,700,789 B2 * 3/2004 Shirasaki ................ H01P 1/047 361/795
6,889,068 B2 5/2005 Kai et al.
10,165,667 B1 12/2018 Christiansen et al.
2004/0257178 A1 * 12/2004 Shimoda .............. H05K 1/0251 333/238
2017/0077580 A1 3/2017 Kawaguchi et al.
2018/0277917 A1 9/2018 Kayano et al.
2020/0251796 A1 * 8/2020 Arai ........................ H01P 5/022
(Continued)

FOREIGN PATENT DOCUMENTS

JP 4236408 B2 3/2009
JP 2017059884 A 3/2017
(Continued)

OTHER PUBLICATIONS

Gupta, et al., "Thin-Film Nb/Polyimide Superconducting Stripline Flexible Cables", IEEE Transactions on Applied Superconductivity, vol. 29, No. 5, Aug. 2019; pp. 1-5.

*Primary Examiner* — Quan Tra
(74) *Attorney, Agent, or Firm* — Holtz, Holtz & Volek PC

(57) ABSTRACT

According to one embodiment, a transmission line includes first and second conductive lines, first and second conductive layers and a first conductive member. At least a part of the first conductive line extends in a first direction. The second conductive line is electrically connected to the first conductive line. At least a part of the second conductive line extends along the first direction. The second conductive layer is electrically connected to the first conductive layer. The second conductive layer includes a first partial region, a second partial region, and a third partial region. A direction from the first partial region to the third partial region and a direction from the second partial region to the third partial region are along the first direction. The second conductive line is between the first conductive layer and the third partial region in a second direction crossing the first direction.

20 Claims, 17 Drawing Sheets

(56) References Cited

U.S. PATENT DOCUMENTS

| | | | | |
|---|---|---|---|---|
| 2023/0071251 | A1 | 3/2023 | Kawaguchi | |
| 2024/0222834 | A1* | 7/2024 | Bi | H01P 3/003 |
| 2024/0372242 | A1 | 11/2024 | Kawaguchi | |

FOREIGN PATENT DOCUMENTS

| | | | |
|---|---|---|---|
| JP | 2018157526 | A | 10/2018 |
| JP | 2021517294 | A | 7/2021 |
| JP | 2022144208 | A | 10/2022 |
| JP | 2024160464 | A | 11/2024 |

* cited by examiner

TRANSMISSION LINE, PROCESSING DEVICE, AND QUANTUM COMPUTER

CROSS-REFERENCE TO RELATED APPLICATIONS

This application is based upon and claims the benefit of priority from Japanese Patent Application No. 2023-203103, filed on Nov. 30, 2023; the entire contents of which are incorporated herein by reference.

FIELD

Embodiments described herein relate generally to a transmission line, a processing device, and a quantum computer.

BACKGROUND

For example, in a processing device such as a quantum computer, a plurality of circuits are coupled by transmission lines. It is desired to improve the characteristics of the transmission line.

DETAILED DESCRIPTION

Figures 1A, 1B, 1C, 1D:
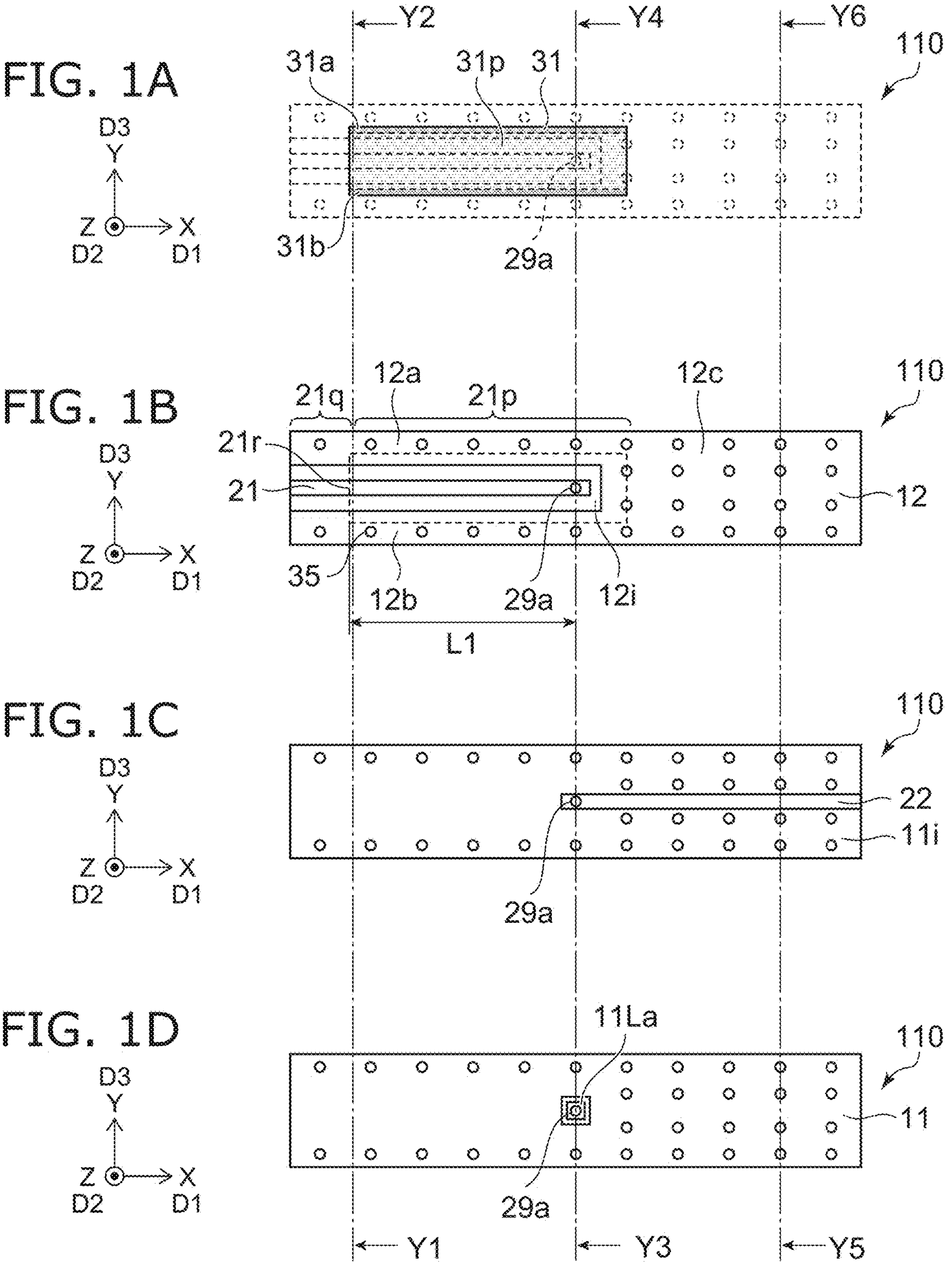
FIGS. 1A to 1D are schematic plan views illustrating a transmission line according to a first embodiment.

According to one embodiment, a transmission line includes a first conductive line, a second conductive line, a first conductive layer, a second conductive layer, and a first conductive member. At least a part of the first conductive line extends in a first direction. The second conductive line is electrically connected to the first conductive line. At least a part of the second conductive line extends along the first direction. The second conductive layer is electrically connected to the first conductive layer. The second conductive layer includes a first partial region, a second partial region, and a third partial region. A direction from the first partial region to the third partial region and a direction from the second partial region to the third partial region are along the first direction. The second conductive line is between the first conductive layer and the third partial region in a second direction crossing the first direction. The first conductive line is between the second partial region and the first partial region in a third direction crossing a plane including the first direction and the second direction. The first conductive member includes a first conductive region. A least a part of the first conductive line is between the first conductive layer and the first conductive region in the second direction. The first conductive member is electrically connected to the second conductive layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIGS. 1A to 1D are schematic plan views illustrating a transmission line according to a first embodiment.

Figure 2A:
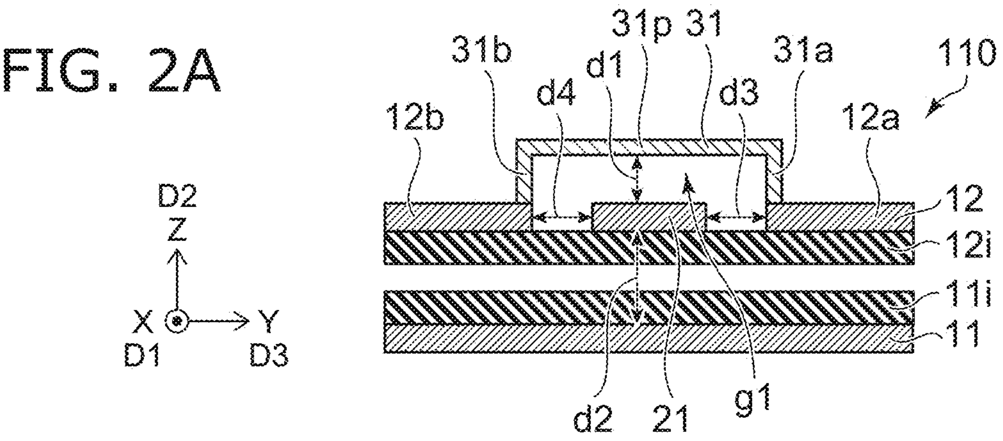
FIGS. 2A to 2C are schematic cross-sectional views illustrating the transmission line according to the first embodiment.
Figure 2B:
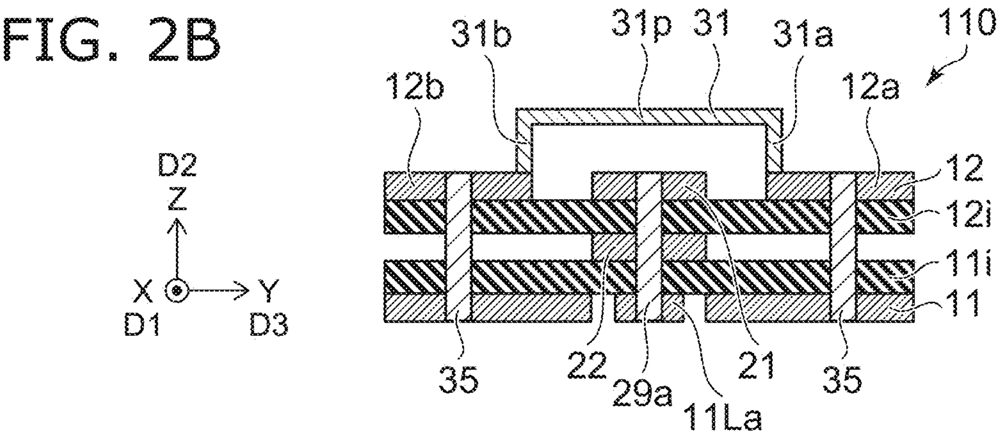
Figure 2C:
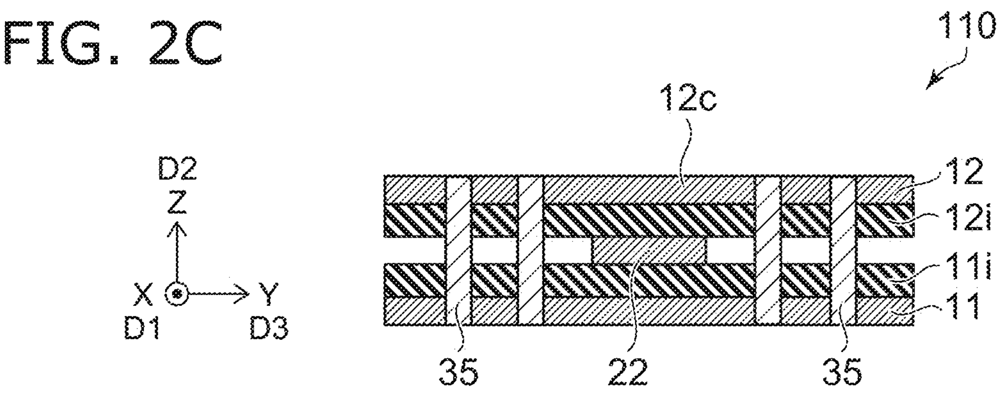

FIGS. 2A to 2C are schematic cross-sectional views illustrating the transmission line according to the first embodiment.

FIG. 2A is a cross-sectional view taken along the line Y1-Y2 in FIGS. 1A to 1D. FIG. 2B is a sectional view taken along the line Y3-Y4 of FIGS. 1A to 1D. FIG. 2C is a sectional view taken along the line Y5-Y6 of FIGS. 1A to 1D.

As shown in FIGS. 1A to 1D and FIGS. 2A to 2C, a transmission line 110 according to the embodiment includes a first conductive line 21, a second conductive line 22, a first conductive layer 11, a second conductive layer 12, and a first conductive member 31.

At least a part of the first conductive line 21 extends along a first direction D1. The second conductive line 22 is electrically connected to the first conductive line 21. At least a part of the second conductive line 22 extends along the first direction D1.

The first direction D1 is defined as an X-axis direction. A direction perpendicular to the X-axis direction is defined as a Z-axis direction. A direction perpendicular to the X-axis direction and the Z-axis direction is a Y-axis direction.

The second conductive layer 12 is electrically connected to the first conductive layer 11. The second conductive layer 12 includes a first partial region 12*a*, a second partial region 12*b*, and a third partial region 12*c*. A direction from the first partial region 12*a* to the third partial region 12*c* and a direction from the second partial region 12*b* to the third partial region 12*c* are along the first direction D1. The boundaries between the first partial region 12*a*, the second partial region 12*b*, and the third partial region 12*c* may be clear or unclear.

As shown in FIG. 2C, the second conductive line 22 is provided between the first conductive layer 11 and the third partial region 12*c* in a second direction D2 crossing the first direction D1. The second direction D2 is, for example, the Z-axis direction.

As shown in FIG. 2A, the first conductive line 21 is provided between the second partial region 12*b* and the first partial region 12*a* in a third direction D3. The third direction D3 crosses a plane including the first direction D1 and the second direction D2. The third direction D3 is, for example, the Y-axis direction.

The first conductive member 31 includes a first conductive region 31*p*. At least a part of the first conductive line 21 is provided between the first conductive layer 11 and the first conductive region 31*p* in the second direction D2. In one example, at least a part of the first conductive region 31*p* extends along the X-Y plane.

The first conductive member 31 is electrically connected to the second conductive layer 12. For example, the potentials of the first conductive layer 11, the second conductive layer 12, and the first conductive member 31 may be fixed, for example. The first conductive layer 11, the second conductive layer 12, and the first conductive member 31 may be set to a ground potential, for example. For example, the first conductive layer 11 is separated from the first conductive line 21 and the second conductive line 22. The second conductive layer 12 is separated from the first conductive line 21 and the second conductive line 22.

In the embodiment, the first conductive line 21 and the second conductive line 22 function as signal lines in the transmission line 110, for example. For example, high frequency signals are supplied to these conductive lines. For example, a radio frequency signal passes through these conductive lines. At least a part of the first conductive line 21 is provided between the first conductive layer 11 and the first conductive member 31. At least a part of the second conductive line 22 is provided between the first conductive layer 11 and the third partial region 12*c* of the second conductive layer 12.

For example, the influence of external radio waves on these conductive lines is suppressed. For example, leakage of radio waves from these conductive lines to the outside is suppressed. For example, the influence of magnetic fields is suppressed. For example, good isolation characteristics can be obtained between multiple transmission lines. For example, signals can be transmitted with low noise and high efficiency. According to the embodiment, a transmission line with improved characteristics can be provided.

As shown in FIGS. 1A and 2A, in this example, the first conductive member 31 further includes a first conductive portion 31*a* and a second conductive portion 31*b*. The first conductive portion 31*a* electrically connects the first conductive region 31*p* to the first partial region 12*a*. The second conductive portion 31*b* electrically connects the first conductive region 31*p* to the second partial region 12*b*. A position of the first conductive line 21 in the third direction D3 is between a position of the second conductive portion 31*b* in the third direction D3 and a position of the first conductive portion 31*a* in the third direction D3.

For example, the first conductive line 21 is provided between the first partial region 12*a* and the second partial region 12*b* in the third direction D3. The first conductive line 21 is provided between the first conductive layer 11 and the first conductive portion 31*a* in a direction inclined with respect to the X-Y plane. The first conductive line 21 is provided between the first conductive layer 11 and the second conductive portion 31*b* in another direction inclined with respect to the X-Y plane. Better isolation can be obtained.

As shown in FIG. 2A, a first gap g1 is provided between at least a part of the first conductive line 21 and the first conductive region 31*p*. Thereby, for example, the influence of reflection by the first conductive member 31 is suppressed. Highly efficient transmission can be obtained.

As shown in FIG. 2A, a distance along the second direction D2 between at least a part of the first conductive line 21 and the first conductive region 31*p* is defined as a first distance d1. A distance between the first conductive layer 11 and the first conductive line 21 along the second direction D2 is defined as a second distance d2. It is preferable that the first distance d1 is longer than the second distance d2. Thereby, it becomes easy to obtain good isolation.

For example, the first distance d1 may be 5 times or more the second distance d2. The first distance d1 may be 500 times or less the second distance d2. It becomes easy to obtain good reflection characteristics.

A distance along the third direction D3 between the first partial region 12*a* and the first conductive line 21 is defined as a third distance d3. It is preferable that the first distance d1 is longer than the third distance d3. A distance along the third direction D3 between the second partial region 12*b* and the first conductive line 21 is defined as a fourth distance d4. It is preferable that the first distance d1 is longer than the fourth distance d4. It becomes easy to obtain good isolation. The first distance d1 may be greater than or equal to the third distance d3. The first distance d1 may be greater than or equal to the fourth distance d4.

For example, the first distance d1 may be not less than 1 time and not more than 10 times the third distance d3. For example, the first distance d1 may be not less than 1 time and not more than 10 times the fourth distance d4.

As shown in FIG. 2B, a position of the second conductive line 22 in the second direction D2 is between a position of the first conductive layer 11 in the second direction D2 and the position of the first conductive line 21 in the second direction D2. For example, the second conductive layer 12 and the first conductive line 21 are provided on one face of a second insulating layer 12*i*. A compact transmission line is obtained.

As shown in FIG. 2B, the transmission line 110 may further include a first conductive connecting member 29*a*. The first conductive connecting member 29*a* electrically connects the second conductive line 22 to the first conductive line 21. The first conductive connecting member 29*a* extends, for example, along the second direction D2.

As shown in FIG. 2B, the transmission line 110 may further include a first connecting conductive layer 11La. The first conductive layer 11 is provided around the first connecting conductive layer 11La in the X-Y plane. The first connecting conductive layer 11La is separated from the first conductive layer 11. The first connecting conductive layer 11La is electrically connected to the first conductive connecting member 29*a*.

As shown in FIG. 2C, a connecting member 35 may be provided. The connecting member 35 electrically connects the second conductive layer 12 to the first conductive layer 11. The connecting member 35 extends along the second direction D2. A plurality of the connecting members 35 may be provided.

The transmission line 110 may further include a first insulating layer 11*i* and a second insulating layer 12*i*. These insulating layers are dielectric layers. These insulating layers may be, for example, insulating substrates. The first insulating layer 11*i* is provided between the first conductive layer 11 and the second conductive line 22 in the second direction D2. The second insulating layer 12*i* is provided between the second conductive line 22 and the first conductive line 21 in the second direction D2.

The first insulating layer 11*i* and the second insulating layer 12*i* may include, for example, at least one selected from the group consisting of polyimide, liquid crystal polymer, glass cloth, fluororesin, and ceramic. Polyimide P or liquid crystal polymers are used, for example, in flexible substrates. The ceramic includes, for example, alumina.

In the embodiment, the first conductive layer 11, the second conductive layer 12, the first conductive line 21, and the second conductive line 22 may include metal. The metal may include, for example, at least one selected from the group consisting of gold and copper. The conductive layer and the conductive line may include at least one selected from the group consisting of aluminum, an alloy including aluminum, an alloy including niobium, an alloy including niobium titanium, tantalum, and an alloy including tantalum.

As shown in FIGS. 1A and 1B, the first conductive line 21 includes a first region 21*p* and a second region 21*q*. The first region 21*p* overlaps the first conductive region 31*p* in the second direction D2. The second region 21*q* does not overlap the first conductive region 31*p* in the second direction D2. A part of the first region 21*p* is electrically connected to the first conductive connecting member 29*a*. A length along the first direction D1 between a boundary 21*r* between the first region 21*p* and the second region 21*q*, and the first conductive connecting member 29*a* is defined as a first length L1. The first length L1 may be, for example, substantially ¼ of the wavelength λ of the signal propagating through the first conductive line 21. The first length L1 may be not less than 0.8 times and not more than 1.2 times ¼ of the wavelength λ. Thereby, good propagation characteristics for this signal can be obtained.

The first length L1 may be not less than 0.8 times and not more than 1.2 times an integer multiple of ¼ of the wavelength λ. In a case where the first length L1 is not less than 0.8 times and not more than 1.2 times ¼ of the wavelength λ, the length of the transmission line 110 can be shortened. It becomes easier to downsize.

In one example, the length of the first conductive line 21 along the first direction D1 is, for example, not less than 10 mm and not more than 80 mm. The length of the second conductive line 22 along the first direction D1 is, for example, not less than 8 mm and not more than 50 mm. The length (width) of the first conductive line 21 along the third direction D3 is, for example, not less than 0.05 mm and not more than 2 mm. The length (width) of the second conductive line 22 along the third direction D3 is, for example, not less than 0.01 mm and not more than 1 mm.

The first distance d1 is, for example, not less than 100 μm and not more than 10000 μm. The second distance d2 is, for example, not less than 10 μm and not more than 1000 μm. The third distance d3 is, for example, not less than 10 μm and not more than 500 μm. The fourth distance d4 is, for example, not less than 10 μm and not more than 500 μm.

FIGS. 3A to 3D are schematic plan views illustrating a transmission line according to the first embodiment.

Figure 4A:
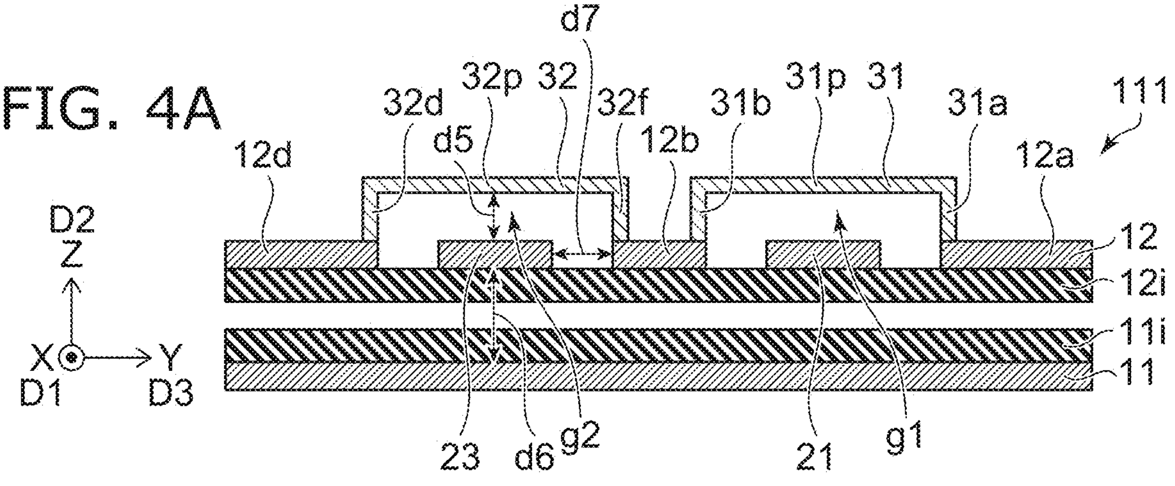
FIGS. 4A to 4C are schematic cross-sectional views illustrating the transmission line according to the first embodiment.
Figure 4B:
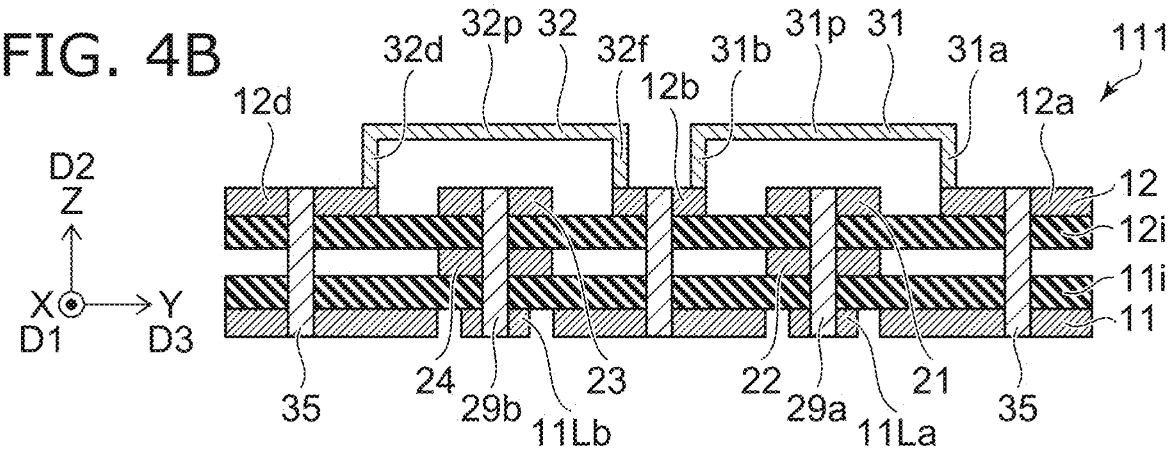
Figure 4C:
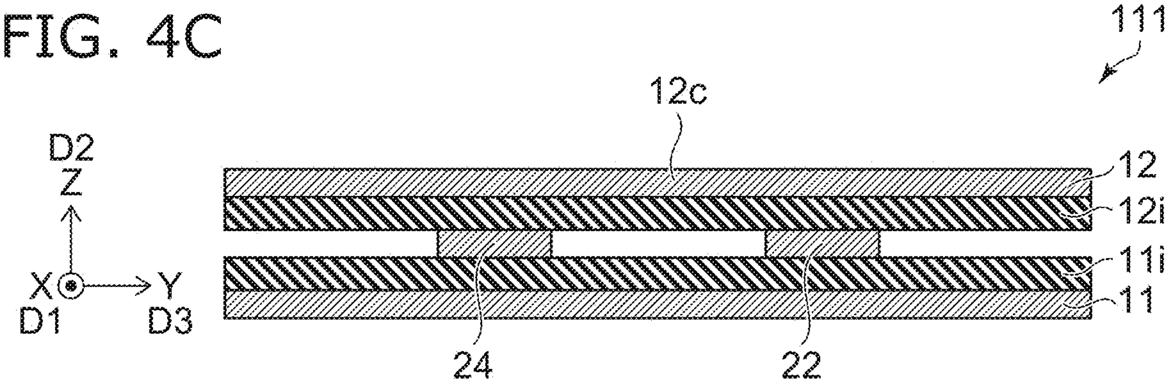

FIGS. 4A to 4C are schematic cross-sectional views illustrating the transmission line according to the first embodiment.

FIG. 4A is a cross-sectional view taken along the line Y1-Y2 in FIGS. 3A to 3D. FIG. 4B is a sectional view taken along the line Y3-Y4 of FIGS. 3A to 3D. FIG. 4C is a sectional view taken along the line Y5-Y6 of FIGS. 3A to 3D.

As shown in these figures, a transmission line 111 according to the embodiment includes a third conductive line 23, a fourth conductive line 24, and a second conductive member 32 in addition to the above-described configuration regarding the transmission line 110.

At least a part of the third conductive line 23 extends along the first direction D1. The fourth conductive line 24 is electrically connected to the third conductive line 23. At least a part of the fourth conductive line 24 extends along the first direction D1. The second conductive member 32 includes a second conductive region 32*p*. A direction from the third conductive line 23 to the first conductive line 21 is along the third direction D3. A direction from the fourth conductive line 24 to the second conductive line 22 is along the third direction D3.

Figure 3A:
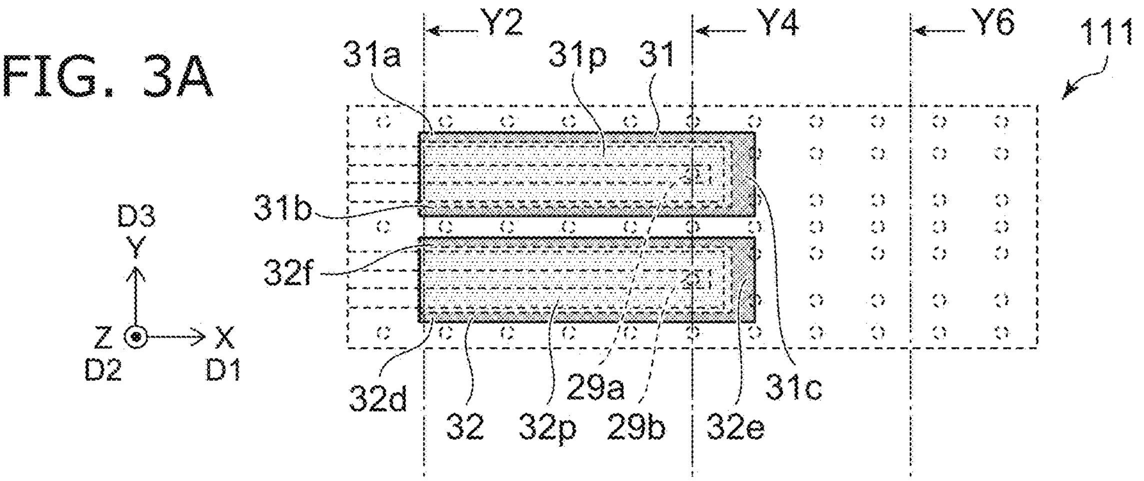
FIGS. 3A to 3D are schematic plan views illustrating a transmission line according to the first embodiment.
Figure 3B:
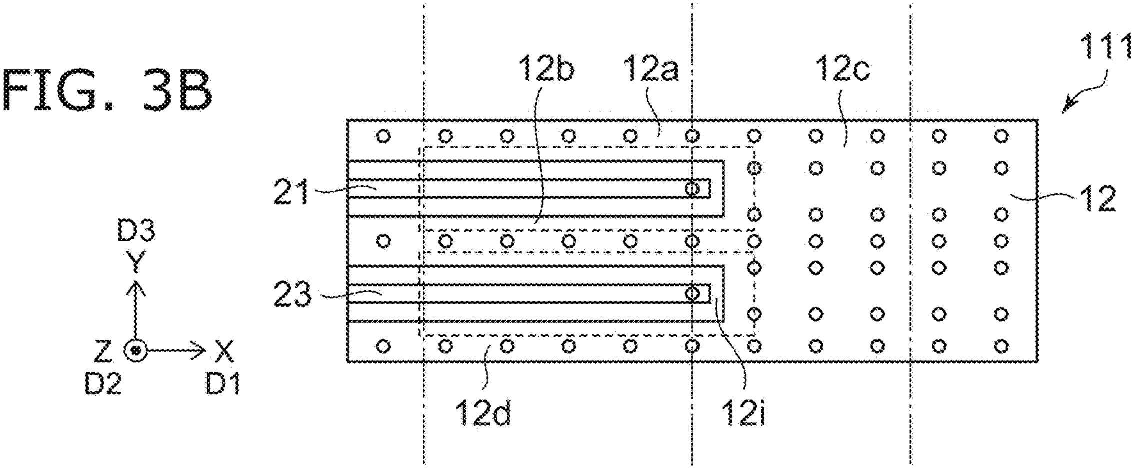
Figure 3C:
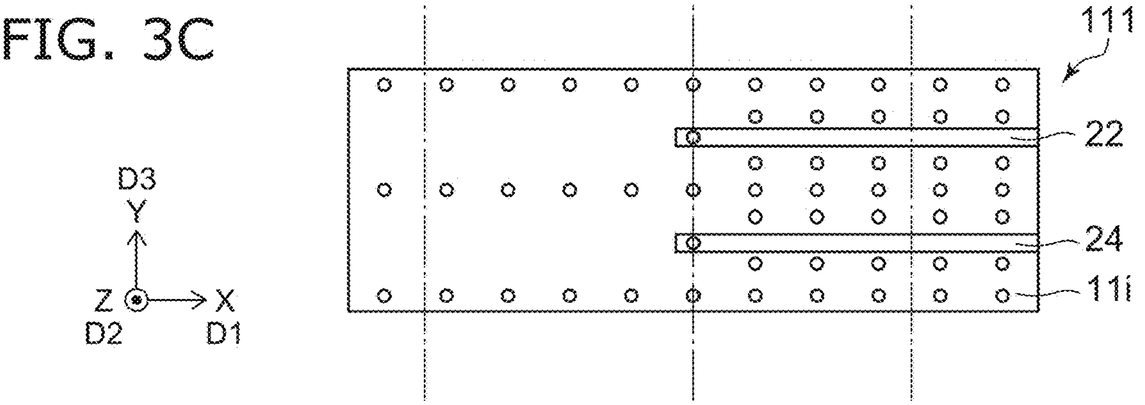
Figure 3D:
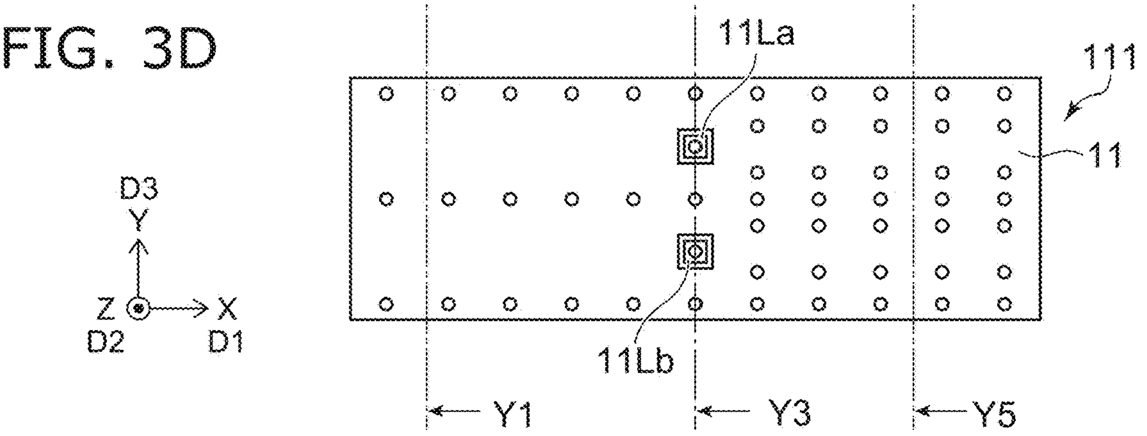

As shown in FIG. 3B, the second conductive layer 12 includes a fourth partial region 12*d*. A direction from the fourth partial region 12*d* to the third partial region 12*c* is along the first direction D1. As shown in FIG. 4C, the fourth conductive line 24 is provided between the first conductive layer 11 and the third partial region 12*c* in the second direction D2.

As shown in FIG. 4B, the third conductive line 23 is provided between the fourth partial region 12*d* and the second partial region 12*b* in the third direction D3. At least a part of the third conductive line 23 is provided between the first conductive layer 11 and the second conductive region 32*p* in the second direction D2. The second conductive member 32 is electrically connected to the second conductive layer 12. A second gap g2 is provided between at least a part of the third conductive line 23 and the second conductive region 32*p*.

For example, the influence of external radio waves on the third conductive line 23 and the fourth conductive line 24 is suppressed. For example, leakage of radio waves from the third conductive line 23 and the fourth conductive line 24 to the outside is suppressed. For example, good isolation characteristics can be obtained between the first conductive line 21 and the third conductive line 23. For example, good isolation characteristics can be obtained between the second conductive line 22 and the fourth conductive line 24. For example, the influence of magnetic fields is suppressed. For example, signals can be transmitted with low noise and high efficiency. According to the embodiment, a transmission line with improved characteristics can be provided.

As shown in FIG. 4B, for example, the fourth conductive line 24 is electrically connected to the third conductive line 23 by a second conductive connecting member 29*b*. The transmission line 111 may further include a second connecting conductive layer 11Lb. The first conductive layer 11 is provided around the second connecting conductive layer 11Lb in the X-Y plane. The second connecting conductive layer 11Lb is separated from the first conductive layer 11.

The second connecting conductive layer 11Lb is electrically connected to the second conductive connecting member 29*b*.

The configuration described above with respect to the first conductive member 31 can be applied to the second conductive member 32. For example, a fifth distance d5 along the second direction D2 between the third conductive line 23 and the second conductive region 32*p* is longer than a sixth distance d6 along the second direction D2 between the first conductive layer 11 and the third conductive line 23. For example, the fifth distance may be not less than 5 times and not more than 500 times the sixth distance. The fifth distance d5 may be equal to or greater than a seventh distance d7 along the third direction D3 between the second partial region 12*b* and the third conductive line 23. The fifth distance d5 may be longer than the seventh distance d7. For example, the fifth distance d5 may be not less than 1 time and not more than 10 times the seventh distance d7.

As shown in FIG. 3A, the first conductive member 31 may further include a third conductive portion 31*c*. The third conductive portion 31*c* electrically connects the first conductive region 31*p* to the third partial region 12*c*. The third conductive portion 31*c* functions as a termination portion, for example.

As shown in FIG. 4B, the second conductive member 32 may further include a fourth conductive portion 32*d*. The fourth conductive portion 32*d* electrically connects the second conductive region 32*p* to the fourth partial region 12*d*. A position of the third conductive line 23 in the third direction D3 is between a position of the fourth conductive portion 32*d* in the third direction D3 and a position of the second conductive portion 31*b* in the third direction D3.

The second conductive member 32 may further include a sixth conductive portion 32*f*. The sixth conductive portion 32*f* electrically connects the second conductive region 32*p* to the second partial region 12*b*. A position of the third conductive line 23 in the third direction D3 is between a position of the fourth conductive portion 32*d* in the third direction D3 and a position of the sixth conductive portion 32*f* in the third direction D3. The sixth conductive portion 32*f* may be continuous with the second conductive portion 31*b*. The sixth conductive portion 32*f* may be omitted and the second conductive portion 31*b* may function as the sixth conductive portion 32*f*.

As shown in FIG. 3A, the second conductive member 32 may further include a fifth conductive portion 32*e*. The fifth conductive portion 32*e* electrically connects the second conductive region 32*p* to the third partial region 12*c*. The fifth conductive portion 32*e* functions as a termination portion, for example.

Figure 5:
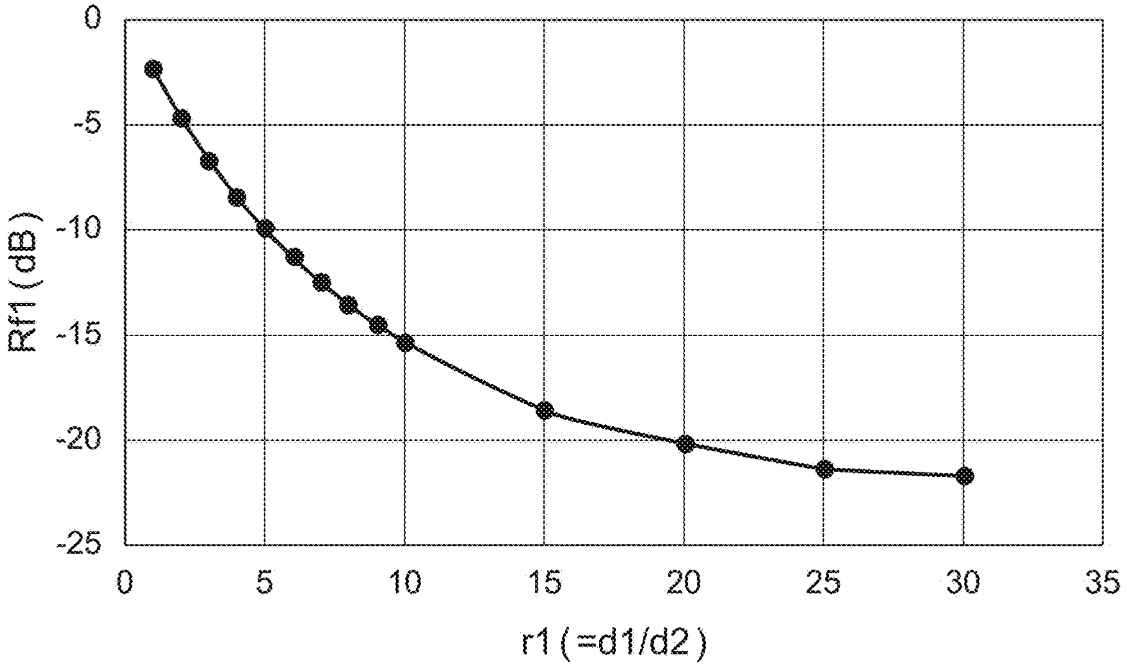
FIG. 5 is a graph illustrating reflection characteristics of the transmission line.

FIG. 5 is a graph illustrating reflection characteristics of the transmission line.

The horizontal axis in FIG. 5 is a first ratio r1. The first ratio r1 is a ratio (d1/d2) of the first distance d1 to the second distance d2. The vertical axis is the reflection characteristic Rf1 (dB). When the reflection characteristic Rf1 is small, the influence of reflection is suppressed and good propagation characteristics can be obtained. As shown in FIG. 5, as the first ratio r1 increases, the reflection characteristic Rf1 decreases. Practically, the first ratio r1 is preferably 5 or more. The first ratio r1 may be 10 or more. The first ratio r1 may be 20 or more. If the first ratio r1 is excessively high, the size of the transmission line becomes large.

Figure 6:
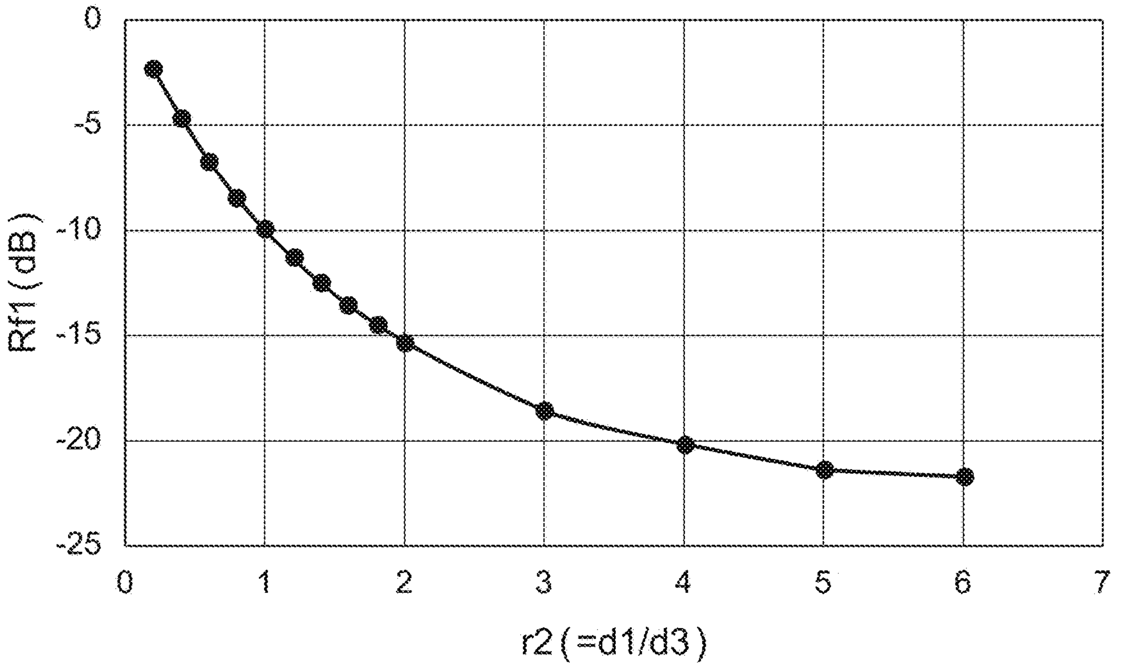
FIG. 6 is a graph illustrating the reflection characteristics of the transmission line.

FIG. 6 is a graph illustrating the reflection characteristics of the transmission line.

The horizontal axis in FIG. 6 is a second ratio r2. The second ratio r2 is a ratio (d1/d3) of the first distance d1 to the third distance d3. In this example, the fourth distance d4 is the same as the third distance d3. The vertical axis is the reflection characteristic Rf1 (dB). As shown in FIG. 6, as the second ratio r2 increases, the reflection characteristic Rf1 decreases. Practically, the second ratio r2 is preferably 1 or more. The second ratio r2 may be 3 or more. The second ratio r2 may be 5 or more. If the second ratio r2 is excessively high, the size of the transmission line becomes large.

Figure 7:
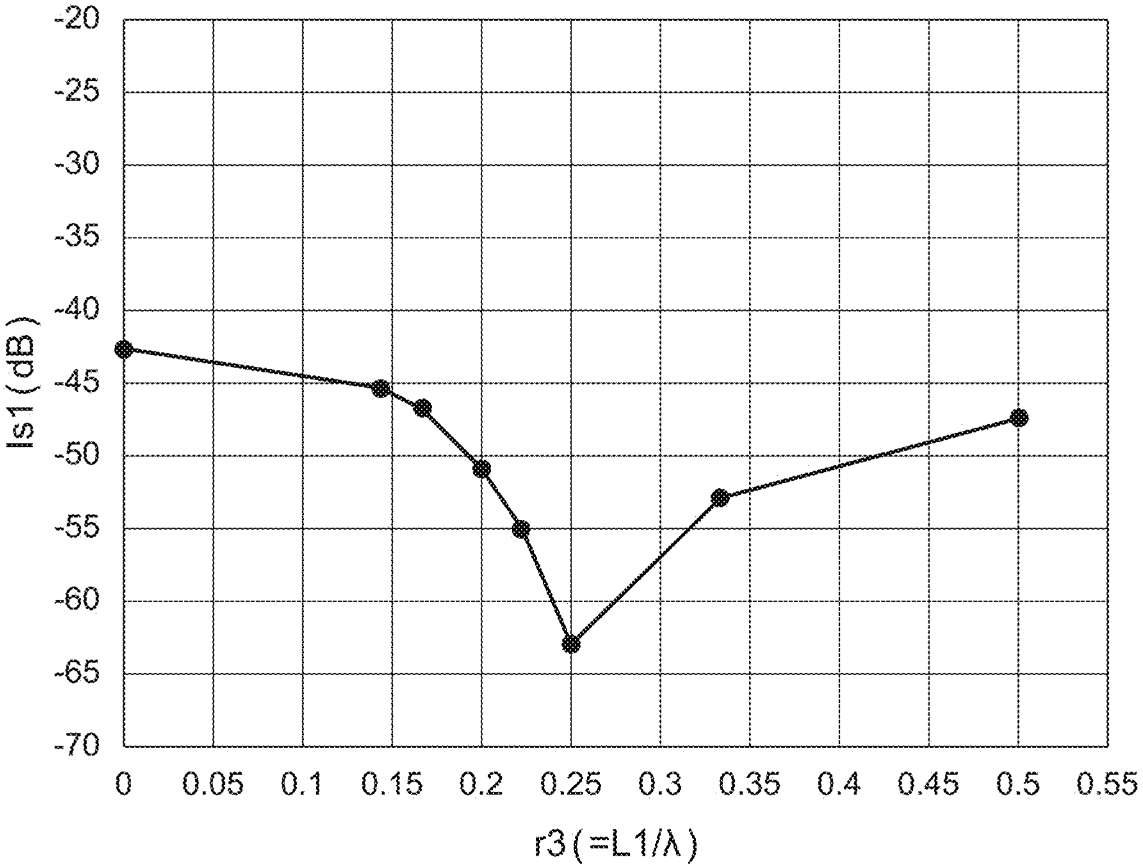
FIG. 7 is a graph illustrating isolation characteristics of the transmission line.

FIG. 7 is a graph illustrating isolation characteristics of the transmission line.

The horizontal axis in FIG. 7 is a third ratio r3. The third ratio r3 is a ratio (L1/A) of the first length L1 to the wavelength of the propagating signal. The vertical axis is the isolation characteristic Is1 (dB) between lines when a plurality of transmission lines are provided (see FIG. 3B). When the isolation characteristic Is1 is small, isolation is obtained and good propagation characteristics are obtained. As shown in FIG. 7, a small isolation characteristic Is1 is obtained when the third ratio r3 is 0.25. Practically, it is desirable that the third ratio r3 is not less than 0.8 times and not more than 1.2 times of 0.25.

Figure 8:
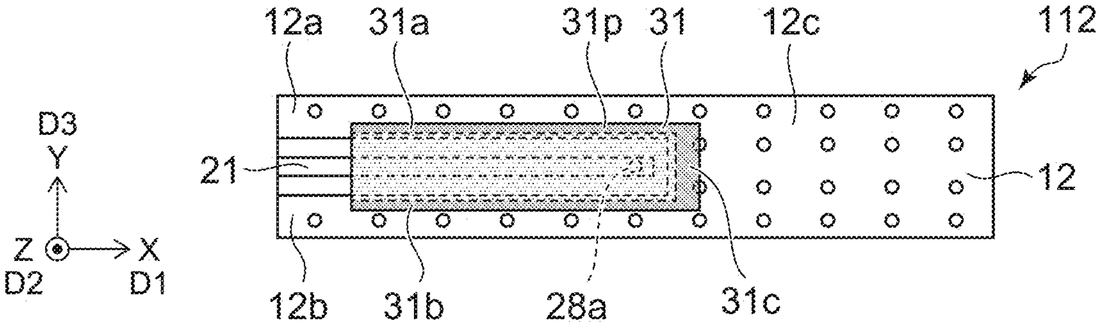
FIG. 8 is a schematic plan view illustrating a transmission line according to the first embodiment.
Figure 9:
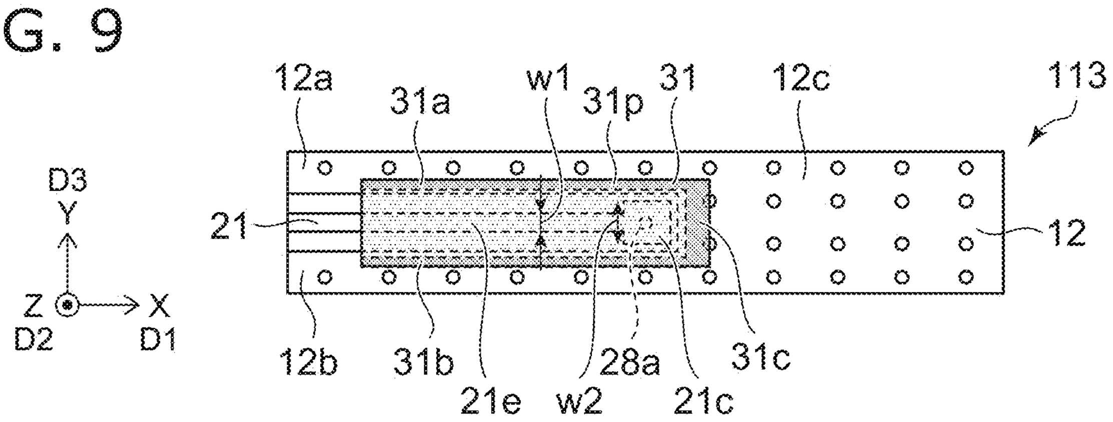
FIG. 9 is a schematic plan view illustrating a transmission line according to the first embodiment.
Figure 10:
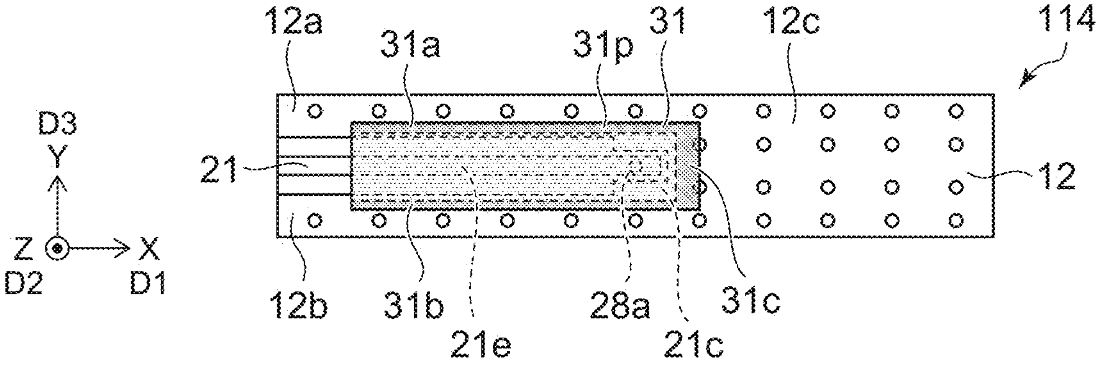
FIG. 10 is a schematic plan view illustrating a transmission line according to the first embodiment.

FIGS. 8 to 10 are schematic plan views illustrating transmission lines according to the first embodiment.

As shown in FIG. 8, in a transmission line 112 according to the embodiment, the first conductive member 31 may further include the third conductive portion 31*c*. The third conductive portion 31*c* electrically connects the first conductive region 31*p* to the third partial region 12*c*. The third conductive portion 31*c* functions as a termination portion, for example. For example, adverse effects on transmission characteristics due to reflection are suppressed. The configuration of the transmission line 112 except for this may be the same as the configuration of the transmission line 110.

As shown in FIG. 9, in a transmission line 113 according to the embodiment, the shape of the first conductive line 21 is different from the shape of the first conductive line 21 in the transmission line 112. The configuration of the transmission line 113 except for this may be the same as the configuration of the transmission line 112.

In the transmission line 113, the first conductive line 21 includes a first linear portion 21*e* and the first connecting portion 21*c*. The first linear portion 21*e* extends along the first direction D1. The first connecting portion 21*c* is connected to the first conductive connecting member 29*a*. A width w2 of the first connecting portion in the third direction D3 is wider than a width w1 of the first linear portion 21*e* in the third direction D3. The first connecting portion 21*c* is, for example, a patch portion. By such a configuration, a more stable connection can be obtained.

As shown in FIG. 10, in a transmission line 114 according to the embodiment, the shape of the second conductive layer 12 is different from the shape of the second conductive layer 12 in the transmission line 112. The configuration of the transmission line 114 except for this may be the same as the configuration of the transmission line 112.

In the transmission line 114, the width of the first partial region 12*a* in the third direction D3 changes stepwise. The width of the second partial region 12*b* along the third direction D3 changes stepwise. For example, a distance in the third direction D3 between the first partial region 12*a* and the first linear portion 21*e* through which a signal propagates in the first direction D1 is longer than a distance in the third direction D3 between the first connecting portion 21*c* and the first partial region 12*a*. For example, a distance in the third direction D3 between the first linear portion 21*e* and the second partial region 12*b* is longer than the distance in the third direction D3 between the first connecting portion 21c and the first partial region 12a. For example, the amount of reflection is reduced. The influence of reflection is effectively suppressed.

In a case where the third conductive portion 31c is provided, the first length L1 may be not less than 0.8 times and not more than 1.2 times an odd multiple of ¼ of the wavelength λ. In a case where the first length L1 is not less than 0.8 times and not more than 1.2 times ¼ of the wavelength λ, the length of the transmission line 110 can be shortened. It becomes easier to downsize.

In the transmission line 112, the transmission line 113, and the transmission line 114 as well, a transmission line with improved characteristics can be provided.

Figure 11A:
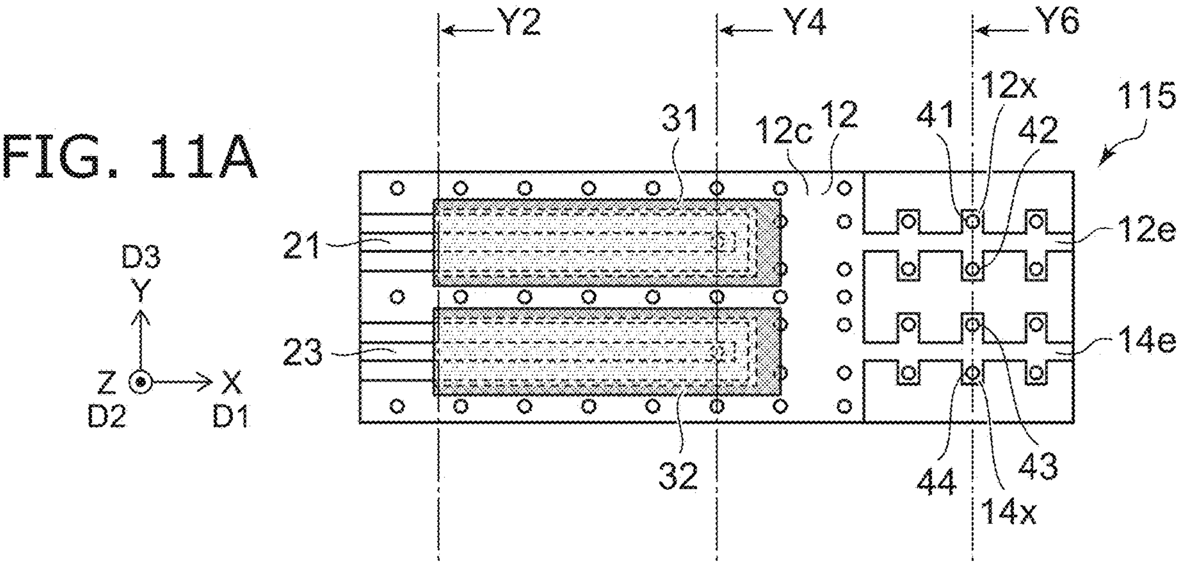
FIGS. 11A to 11C are schematic plan views illustrating a transmission line according to the first embodiment.
Figure 11B:
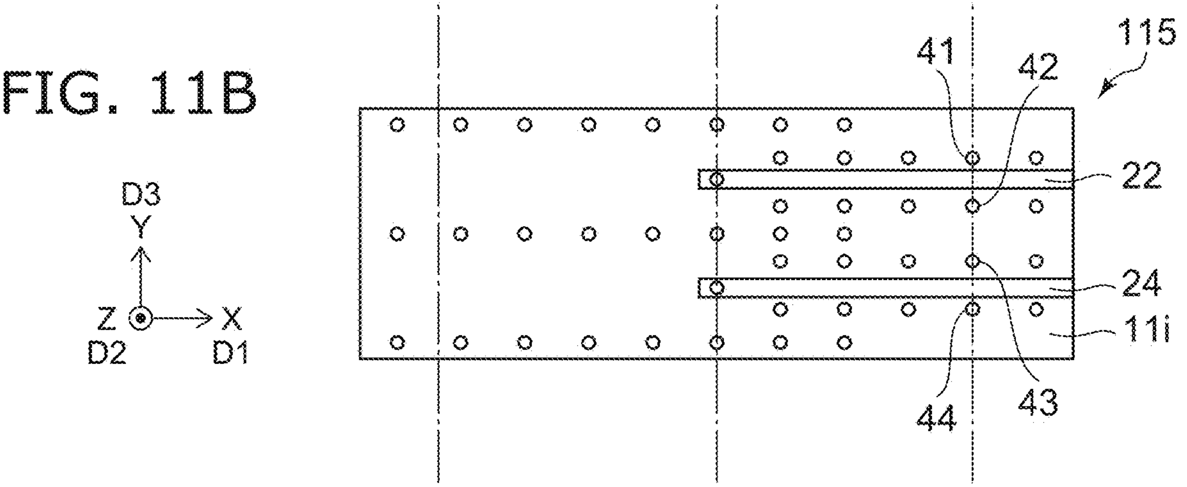
Figure 11C:
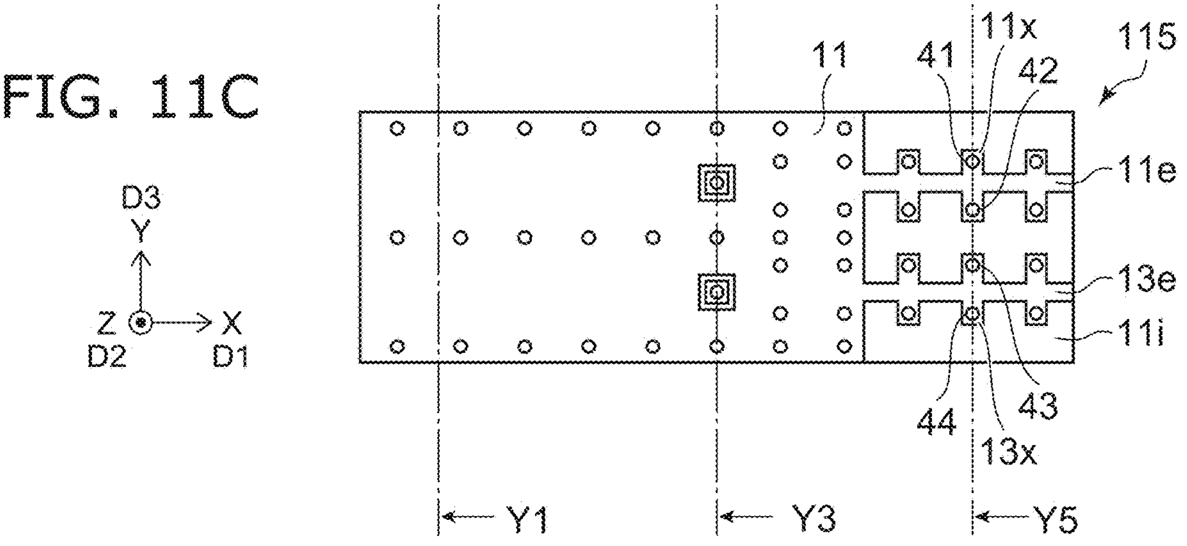

FIGS. 11A to 11C are schematic plan views illustrating a transmission line according to the first embodiment.

Figure 12A:
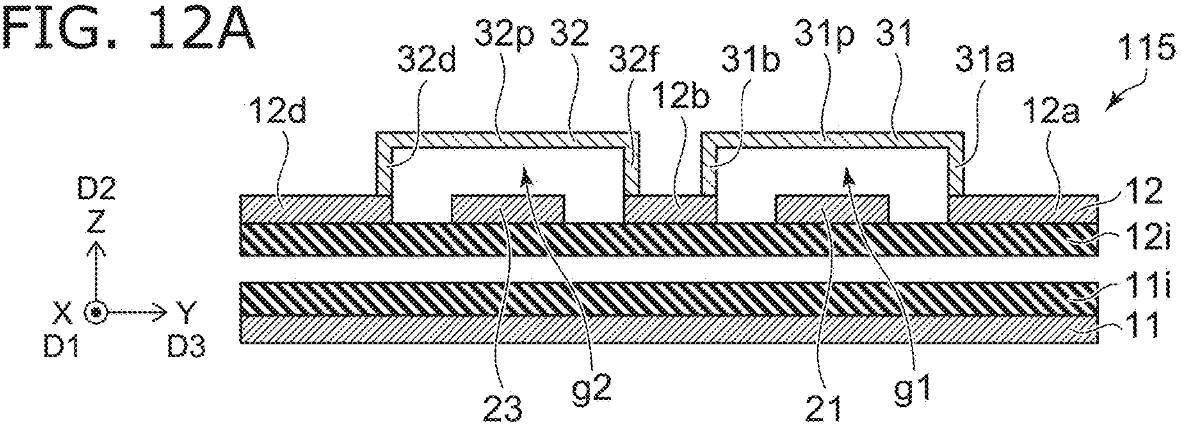
FIGS. 12A to 12C are schematic cross-sectional views illustrating the transmission line according to the first embodiment.
Figure 12B:
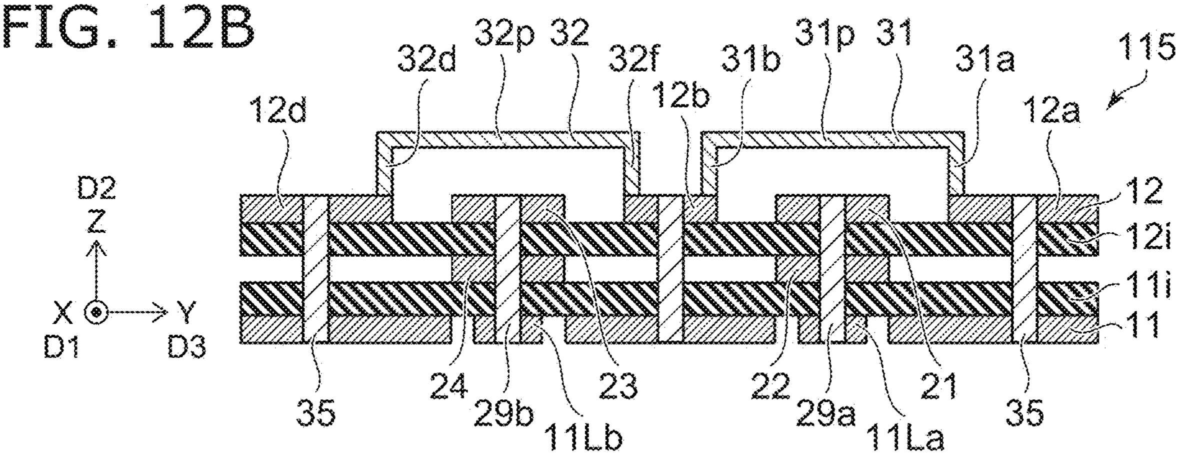
Figure 12C:
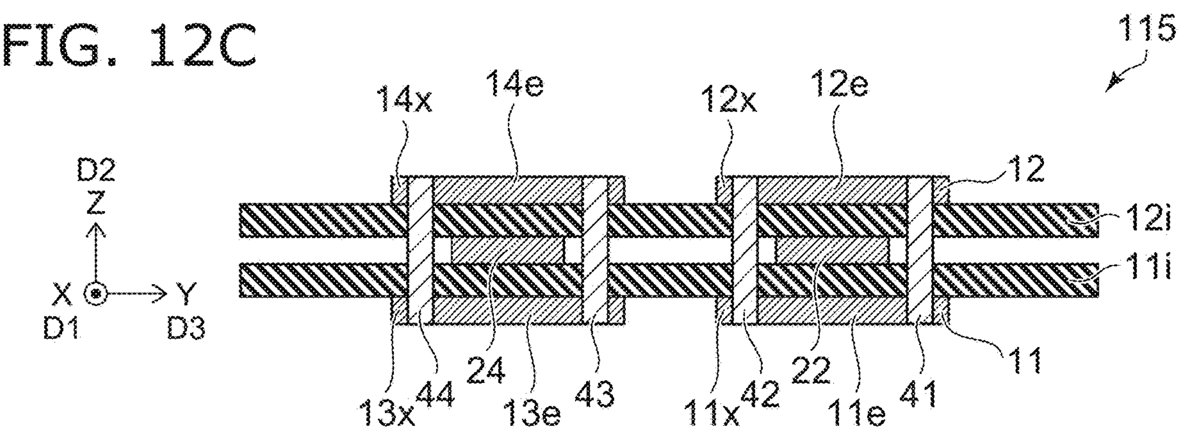

FIGS. 12A to 12C are schematic cross-sectional views illustrating the transmission line according to the first embodiment.

FIG. 12A is a sectional view taken along the line Y1-Y2 in FIGS. 11A to 11C. FIG. 12B is a sectional view taken along the line Y3-Y4 in FIGS. 11A to 11C. FIG. 12C is a sectional view taken along the line Y5-Y6 in FIGS. 11A to 11C.

As shown in these figures, a transmission line 115 according to the embodiment further includes a first connecting member 41 and a second connecting member 42.

As shown in FIG. 11C, the first conductive layer 11 includes a first extending region 11e along the first direction D1 and a plurality of first crossing regions 11x. The plurality of first crossing regions 11x are arranged along the first direction D1. The plurality of first crossing regions 11x are connected to the first extending region 11e. A length of each of the plurality of first crossing regions 11x in the third direction D3 is longer than a length of the first extending region 11e in the third direction D3. Each of the plurality of first crossing regions 11x extends, for example, in the third direction D3.

As shown in FIG. 11A, the second conductive layer 12 includes a second extending region 12e along the first direction D1 and a plurality of second crossing regions 12x. The plurality of second crossing regions 12x are arranged along the first direction D1. The plurality of second crossing regions 12x are connected to the second extending region 12e. A length of each of the plurality of second crossing regions 12x in the third direction D3 is longer than a length of the second extending region 12e in the third direction D3. Each of the plurality of second crossing regions 12x extends, for example, in the third direction D3.

As shown in FIG. 12C, the first connecting member 41 electrically connects a part of one of the plurality of second crossing regions 12x to a part of one of the plurality of first crossing regions 11x. The second connecting member 42 electrically connects another part of one of the plurality of second crossing regions 12x to another part of one of the plurality of first crossing regions 11x. A part of the second conductive line 22 is provided between the first connecting member 41 and the second connecting member 42 in the third direction D3. For example, a part of the second conductive line 22 is provided between the first extending region 11e and the second extending region 12e in the second direction D2.

By being connected by the first connecting member 41 and the second connecting member 42, the potentials of the first extending region 11e and the second extending region 12e are stabilized. Isolation can be effectively obtained in the second conductive line 22 by the first extending region 11e and the second extending region 12e.

The pitch of the plurality of first crossing regions 11x may be ¼ or less of the wavelength A of the signal propagating through the second conductive line 22. The pitch of the plurality of second crossing regions 12x may be ¼ or less of the wavelength λ of the signal propagating through the second conductive line 22.

The first extending region 11e is thin except for the plurality of first crossing regions 11x. The second extending region 12e is thin except for the plurality of second crossing regions 12x. For example, heat conduction can be effectively suppressed. For example, highly efficient transmission is possible while suppressing heat conduction.

As shown in FIG. 11C, the first conductive layer 11 may include a third extending region 13e along the first direction D1 and a plurality of third crossing regions 13x along the third direction D3. The plurality of third crossing regions 13x are arranged along the first direction D1. The plurality of third crossing regions 13x are connected to the third extending region 13e. A length of each of the plurality of third crossing regions 13x in the third direction D3 is longer than a length of the third extending region 13e in the third direction D3.

As shown in FIG. 11A, the second conductive layer 12 includes a fourth extending region 14e along the first direction D1 and a plurality of fourth crossing regions 14x along the third direction D3. The plurality of fourth crossing regions 14x are arranged along the first direction D1. The plurality of fourth crossing regions 14x are connected to the fourth extending region 14e. A length of each of the plurality of fourth crossing regions 14x in the third direction D3 is longer than a length of the fourth extending region 14e in the third direction D3.

The transmission line 115 may further include a third connecting member 43 and a fourth connecting member 44. The third connecting member 43 electrically connects a part of one of the plurality of fourth crossing regions 14x to a part of one of the plurality of third crossing regions 13x. The fourth connecting member 44 electrically connects another part of one of the plurality of fourth crossing regions 14x to another part of one of the plurality of third crossing regions 13x. A part of the fourth conductive line 24 is provided between the third connecting member 43 and the fourth connecting member 44 in the third direction D3. For example, a part of the fourth conductive line 24 is provided between the third extending region 13e and the fourth extending region 14e in the second direction D2. For example, highly efficient transmission is possible while suppressing heat conduction.

FIGS. 13A to 13C, FIG. 14A, and FIG. 14B are schematic plan views illustrating a transmission line according to the first embodiment.

Figure 15:
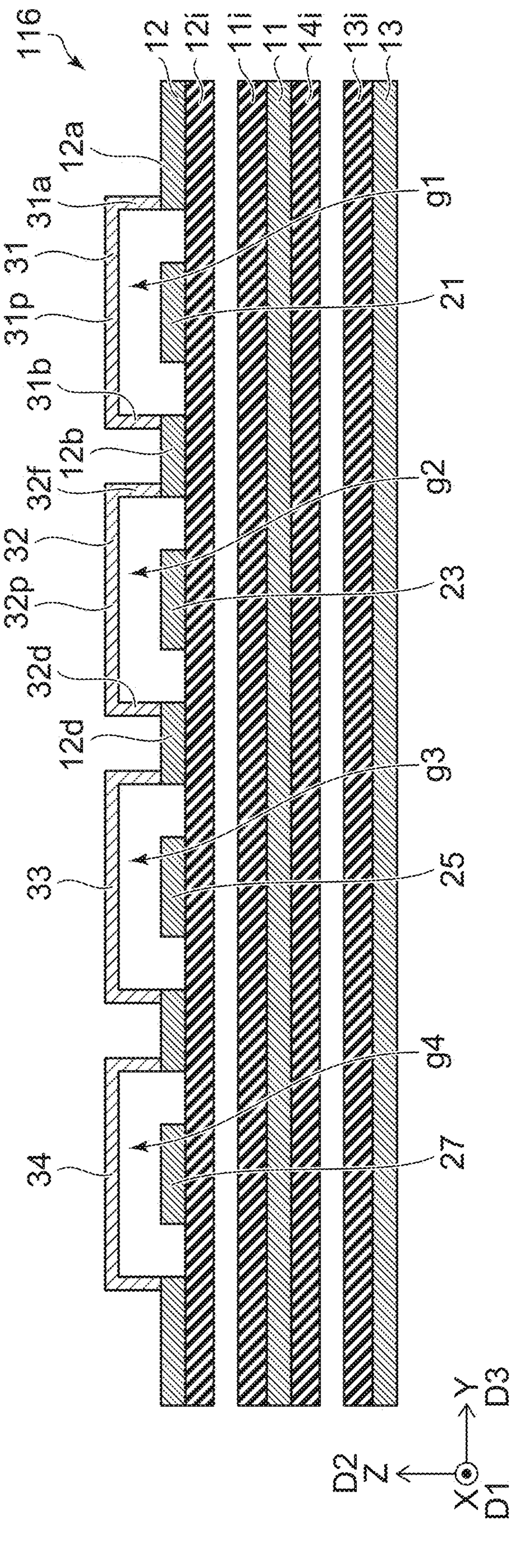
FIG. 15 is a schematic cross-sectional view illustrating the transmission line according to the first embodiment.
Figure 16:
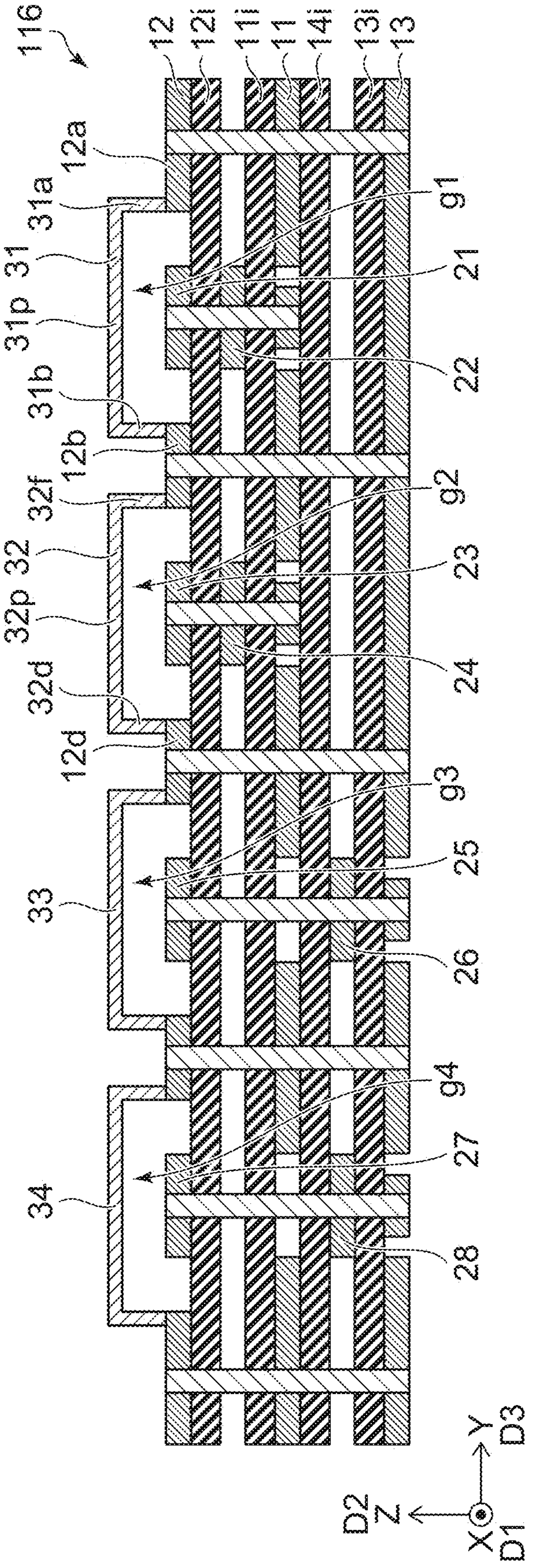
FIG. 16 is a schematic cross-sectional view illustrating the transmission line according to the first embodiment.
Figure 17:
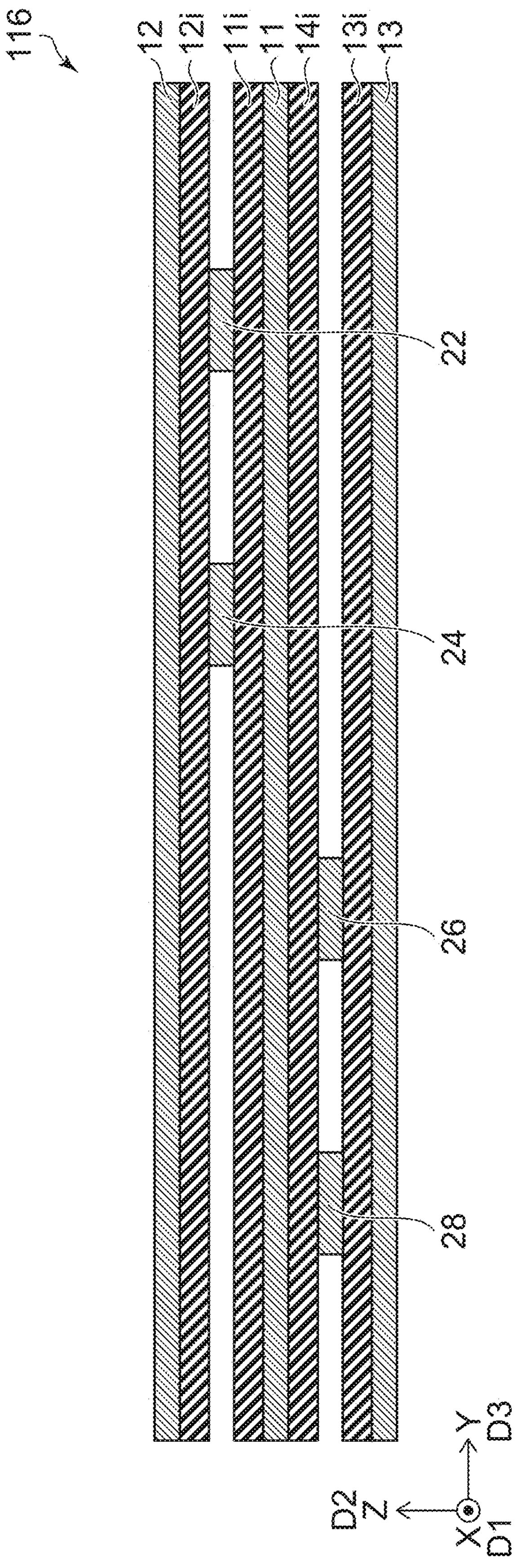
FIG. 17 is schematic cross-sectional view illustrating the transmission line according to the first embodiment.

FIGS. 15 to 17 are schematic cross-sectional views illustrating the transmission line according to the first embodiment.

Figures 13A, 13B, 13C:
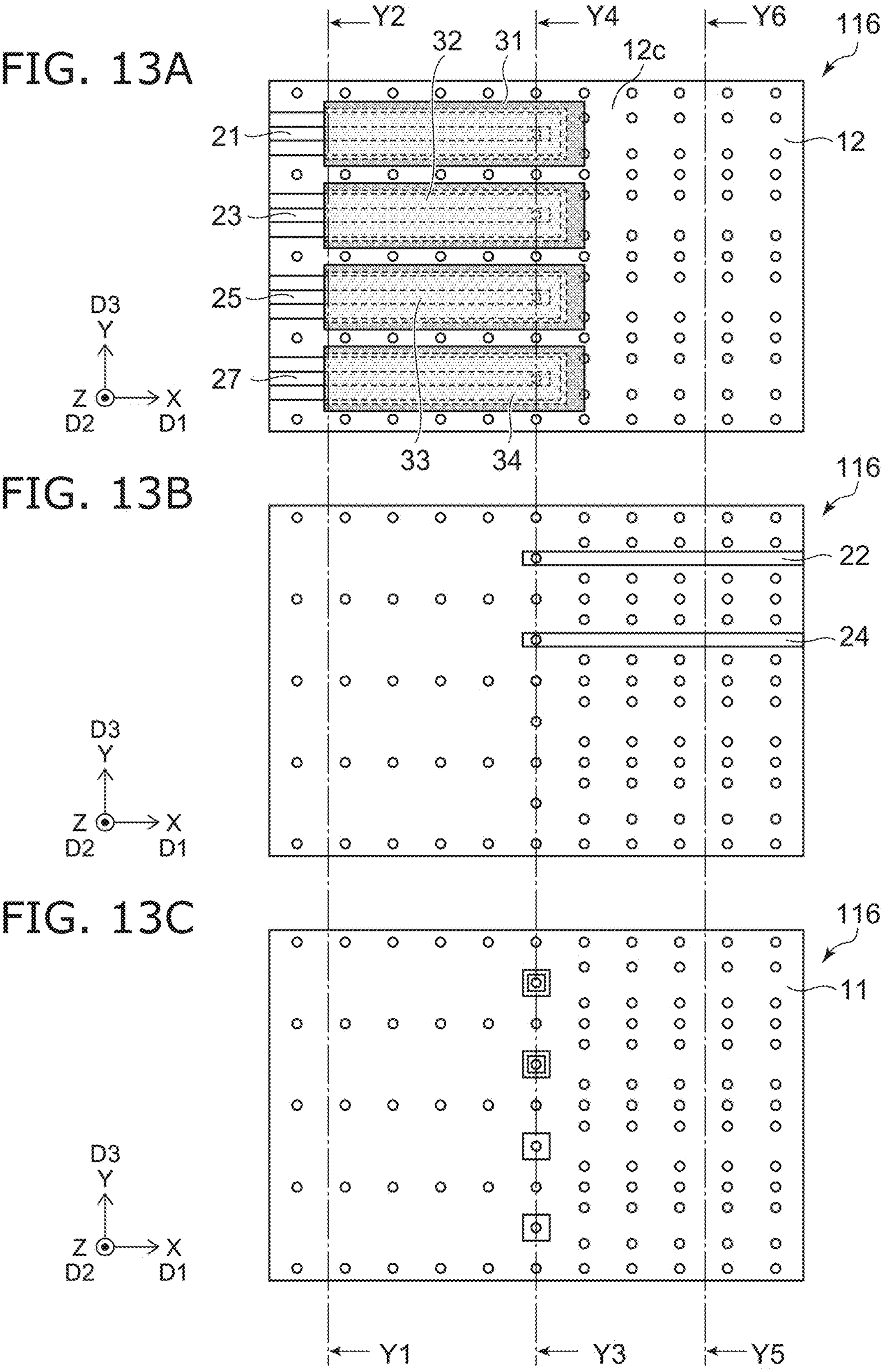
FIGS. 13A to 13C are schematic plan views illustrating a transmission line according to the first embodiment.
Figure 14A:
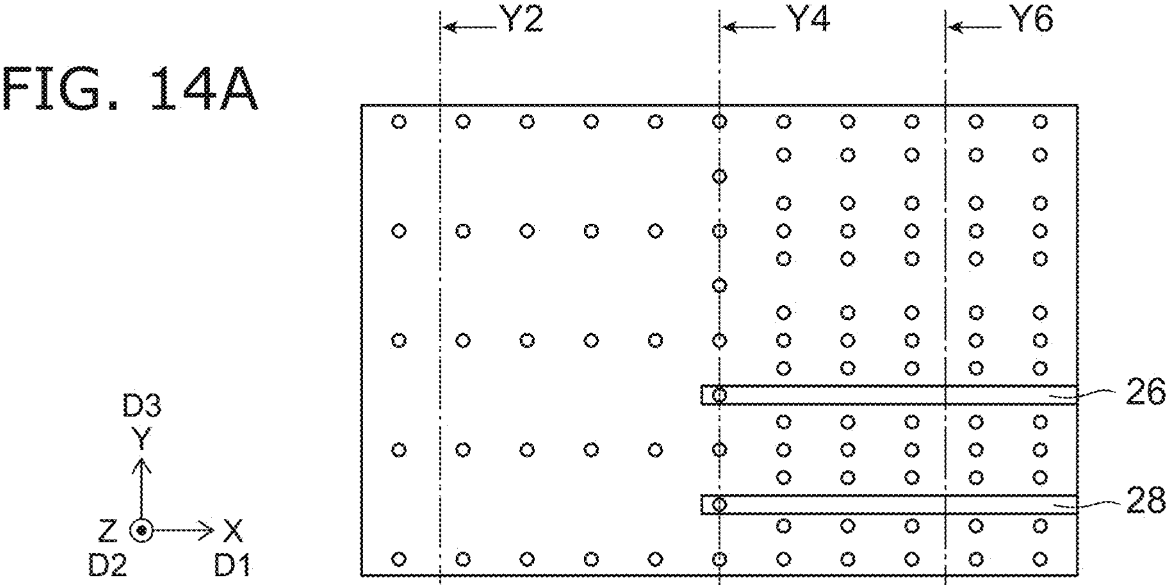
FIG. 14A and FIG. 14B are schematic plan views illustrating the transmission line according to the first embodiment.
Figure 14B:
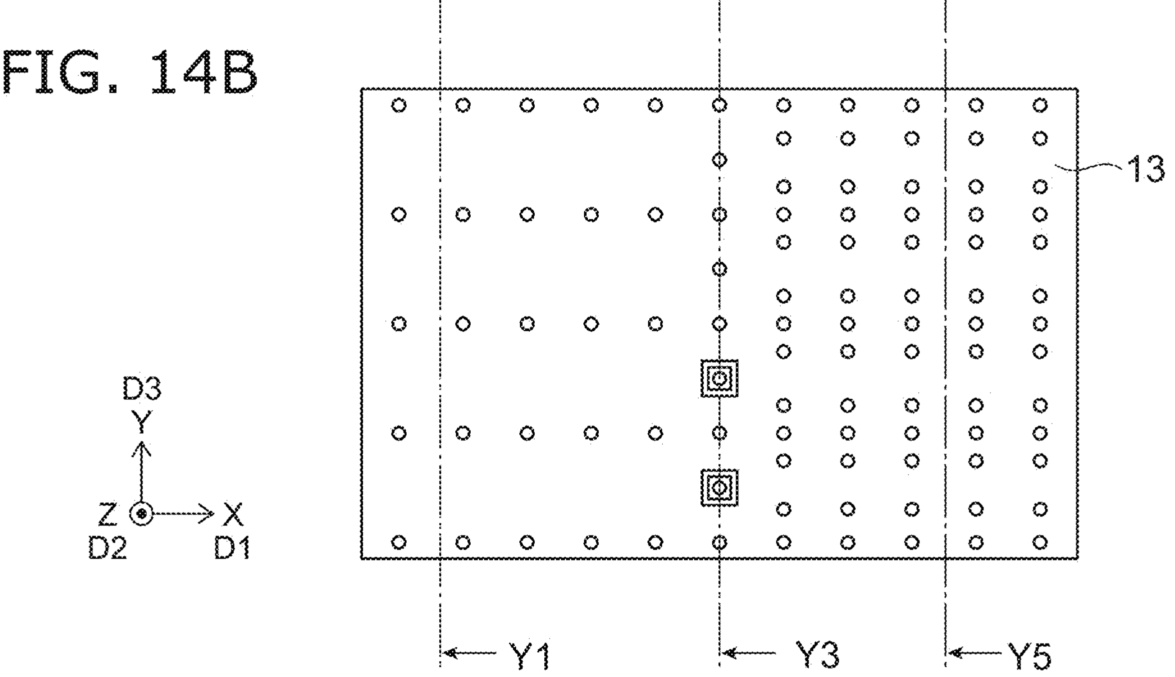

FIG. 15 is a sectional view taken along the line Y1-Y2 of FIGS. 13A to 13A, FIG. 14A, and FIG. 14B. FIG. 16 is a sectional view taken along the line Y3-Y4 of FIGS. 13A to 13C, FIG. 14A, and FIG. 14B. FIG. 17 is a sectional view taken along the line Y5-Y6 of FIGS. 13A to 13C, FIG. 14A, and FIG. 14B.

As illustrated in these figures, a transmission line 116 according to the embodiment includes a fifth conductive line 25, a sixth conductive line 26, a seventh conductive line 27, an eighth conductive line 28, a third conductive member 33, a fourth conductive member 34, and a third conductive layer 13. The configuration of the transmission line 116 except for this may be the same as the configuration of the transmission line 111, for example.

The fifth conductive line 25 and the seventh conductive line 27 are along the first direction D1. The sixth conductive line 26 is electrically connected to the fifth conductive line 25. At least a part of the sixth conductive line 26 extends along the first direction D1. The eighth conductive line 28 is electrically connected to the fifth conductive line 25. At least a part of the sixth conductive line 26 extends along the first direction D1. A direction from the fifth conductive line 25 to the first conductive line 21 is along the third direction D3. A direction from the seventh conductive line 27 to the first conductive line 21 is along the third direction D3.

The third conductive member 33 and the fourth conductive member 34 are electrically connected to the second conductive layer 12. At least a part of the fifth conductive line 25 is provided between the first conductive layer 11 and the third conductive member 33 in the second direction D2. At least a part of the seventh conductive line 27 is provided between the first conductive layer 11 and the fourth conductive member 34 in the second direction D2.

In this example, the sixth conductive line 26 is provided between the third conductive layer 13 and the first conductive layer 11 in the second direction D2. the eighth conductive line 28 is provided between the third conductive layer 13 and the first conductive layer 11 in the second direction D2.

Good isolation characteristics are obtained in the fifth conductive line 25, the sixth conductive line 26, the seventh conductive line 27, and the eighth conductive line 28.

Figure 18A:
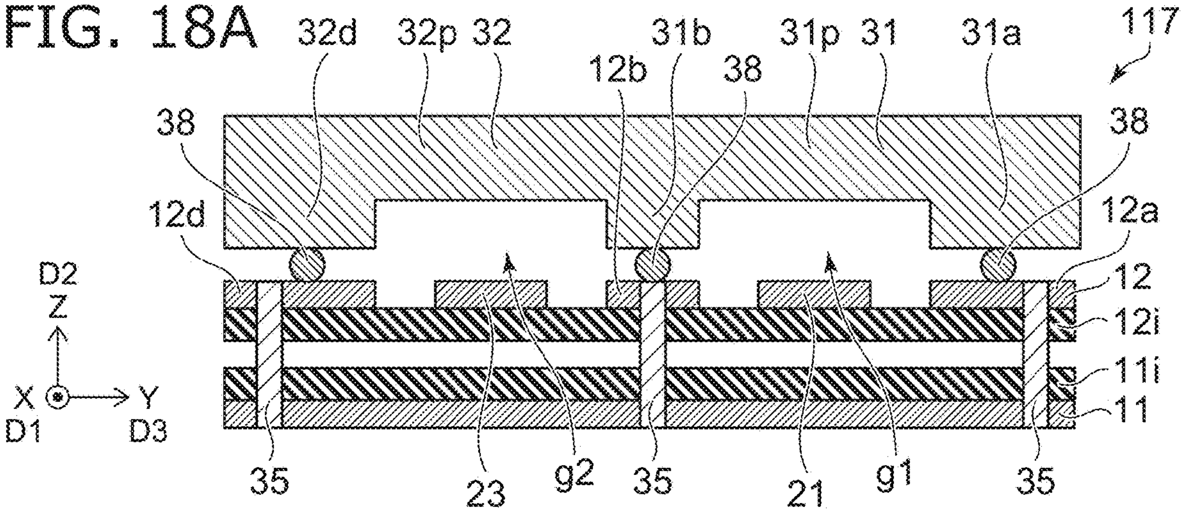
FIGS. 18A to 18C are schematic cross-sectional views illustrating a transmission line according to the first embodiment.
Figure 18B:
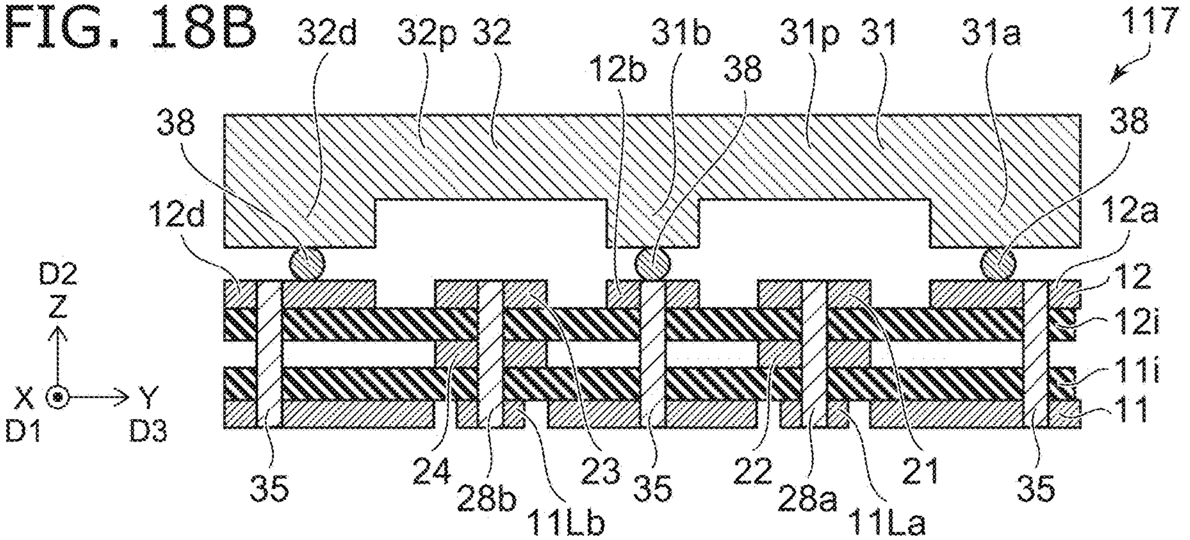
Figure 18C:
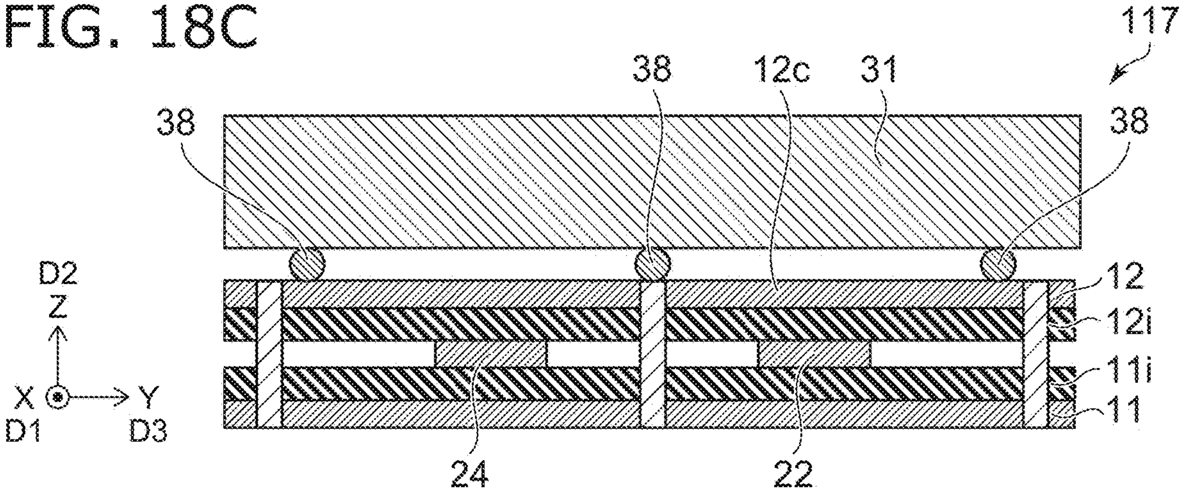

In this example, the transmission line 116 includes a third insulating layer 13*i*. The third insulating layer 13*i* is provided between the third conductive layer 13 and the sixth conductive line 26, and between the third conductive layer 13 and the eighth conductive line 28 in the second direction D2. Transmission line 116 includes a fourth insulating layer 14*i*. The fourth insulating layer 14*i* is provided between the sixth conductive line 26 and the first conductive layer 11, and between the eighth conductive line 28 and the first conductive layer 11 in the second direction D2. FIGS. 18A to 18C are schematic cross-sectional views illustrating a transmission line according to the first embodiment. As shown in these figures, in a transmission line 117 according to the embodiment, the second conductive member 32 is continuous with the first conductive member 31. The configuration of the transmission line 117 except for this may be the same as that of the transmission line 111.

In the transmission line 117, the first conductive member 31 and the second conductive member 32 are electrically connected to the second conductive layer 12 by the conductive member connecting member 38. The conductive member connecting member 38 may include, for example, metal.

Figure 19A:
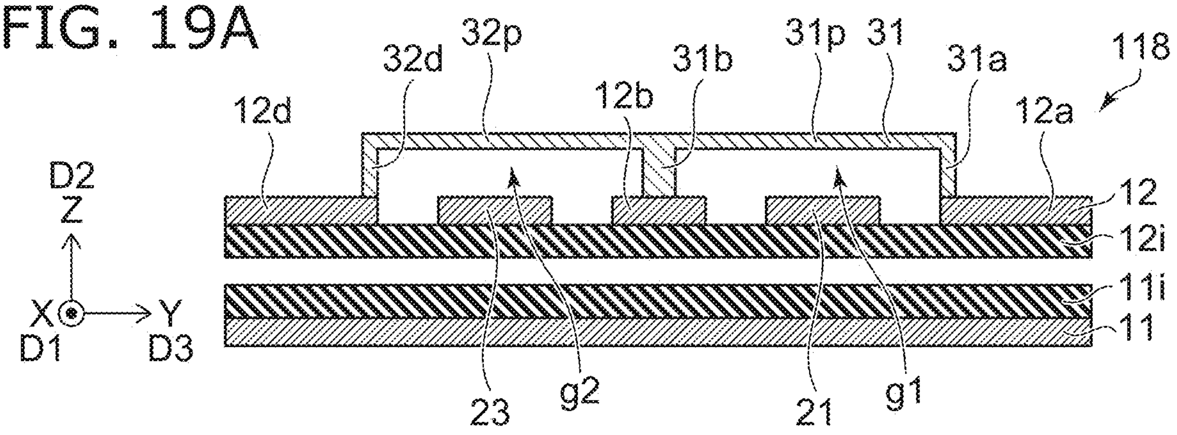
FIGS. 19A to 19C are schematic cross-sectional views illustrating a transmission line according to the first embodiment.
Figure 19B:
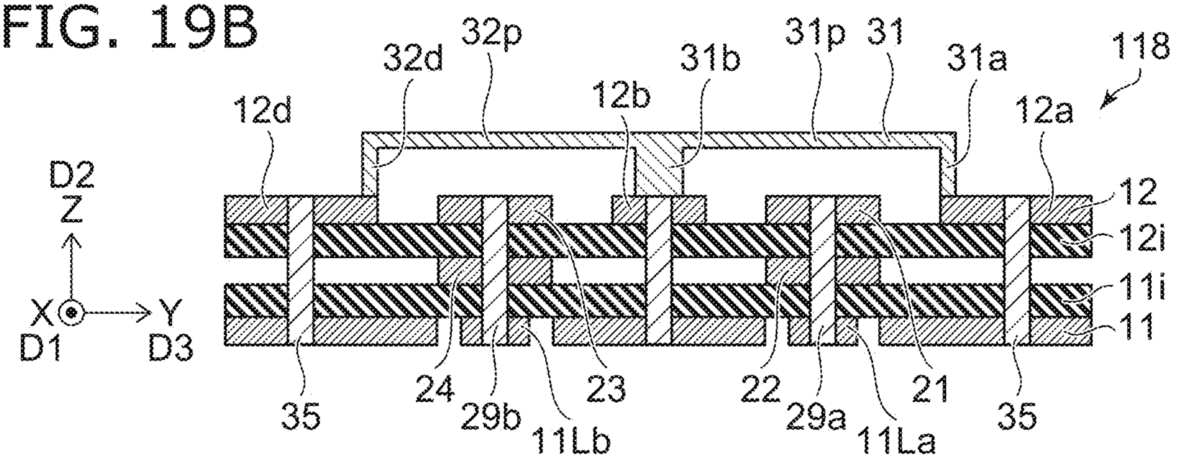
Figure 19C:
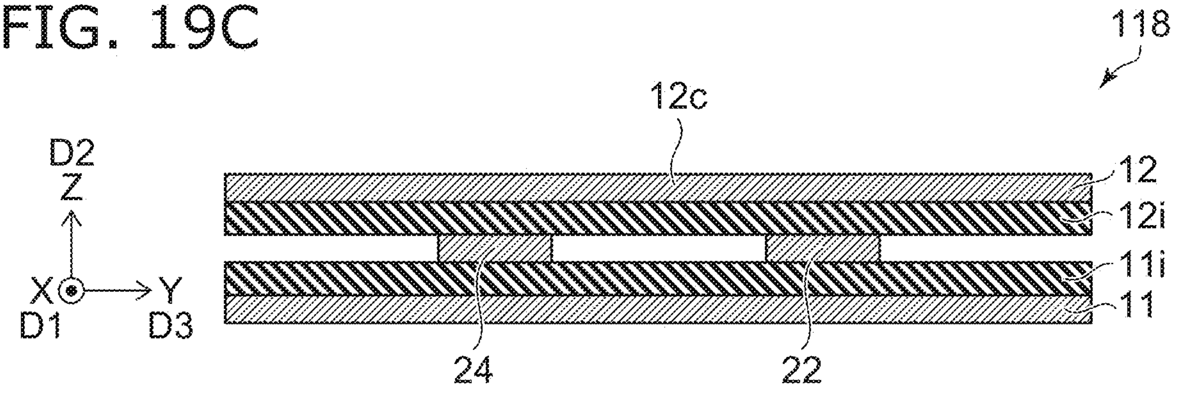

FIGS. 19A to 19C are schematic cross-sectional views illustrating a transmission line according to the first embodiment. As illustrated in these drawings, a transmission line 118 according to the embodiment includes the third conductive line 23 and the fourth conductive line 24 in addition to the first conductive layer 11, the second conductive layer 12, and the first conductive member 31 described with respect to the transmission line 110. The transmission line 118 may be regarded as a configuration in which the second conductive member 32 is continuous with the first conductive member 31.

At least a part of the third conductive line 23 extends along the first direction D1. The fourth conductive line 24 is electrically connected to the third conductive line 23. At least a part of the fourth conductive line 24 extends along the first direction D1. The direction from the third conductive line 23 to the first conductive line 21 is along the third direction D3. The direction from the fourth conductive line 24 to the second conductive line 22 is along the third direction D3.

As shown in FIG. 3B, the second conductive layer 12 includes the fourth partial region 12*d*. The direction from the fourth partial region 12*d* to the third partial region 12*c* is along the first direction D1. As shown in FIG. 4C, the fourth conductive line 24 is provided between the first conductive layer 11 and the third partial region 12*c* in the second direction D2.

The first conductive member 31 includes the second conductive region 32*p*. The first conductive member 31 may further include the fourth conductive portion 32*d*.

The third conductive line 23 is between the fourth partial region 12*d* and the second partial region 12*b* in the third direction D3. At least a part of the third conductive line 23 is between the first conductive layer 11 and the second conductive region 32*p* in the second direction D2. The second gap g2 is provided between at least a part of the third conductive line 23 and the second conductive region 32*p*.

The fourth conductive portion 32*d* electrically connects the second conductive region 32*p* to the fourth partial region 12*d*. The position of the third conductive line 23 in the third direction D3 is between the position of the fourth conductive portion 32*d* in the third direction D3 and the position of the second conductive portion 31*b* in the third direction D3.

The first conductive member 31 may further include the fifth conductive portion 32*e* (see FIG. 3A). The fifth conductive portion 32*e* electrically connects the second conductive region 32*p* to the third partial region 12*c*. In the transmission line 118 as well, a transmission line whose characteristics can be improved can be provided.

Second Embodiment

Figure 20:
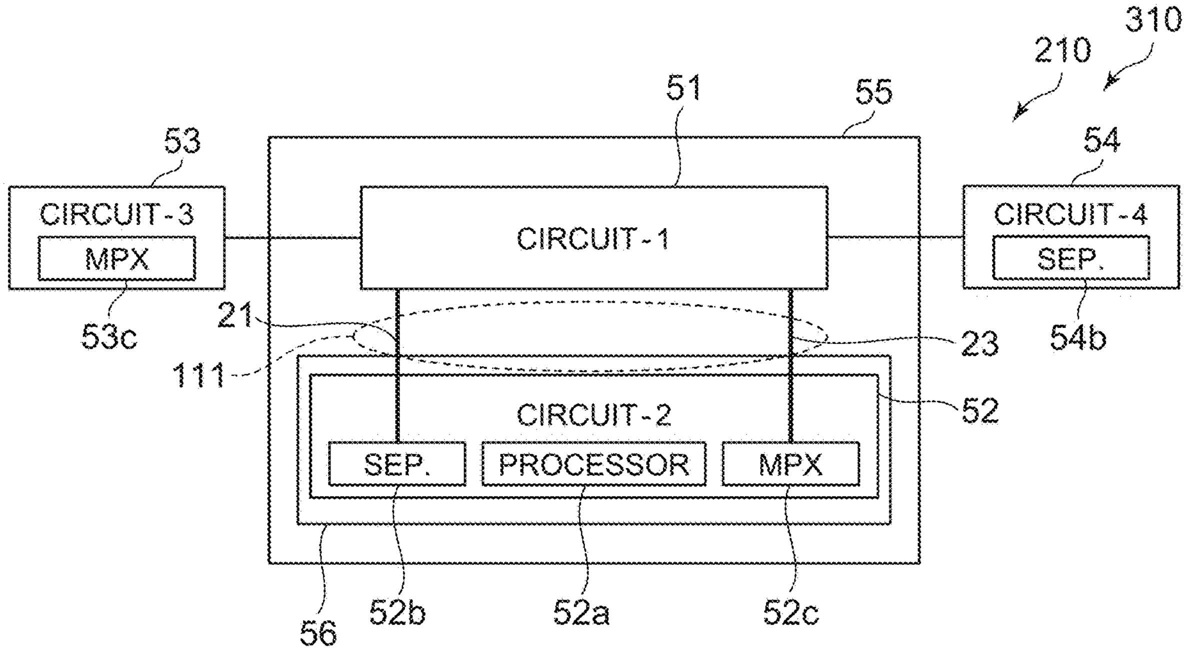
FIG. 20 is a schematic diagram illustrating a processing device according to a second embodiment.

FIG. 20 is a schematic diagram illustrating a processing device according to a second embodiment.

As shown in FIG. 20, a processing device 210 according to the embodiment includes the transmission line (in this example, the transmission line 111) according to the first embodiment, a first signal processing circuit 51, and a second signal processing circuit 52. For example, one end of the first conductive line 21 can be coupled with the first signal processing circuit 51. For example, the other end of the first conductive line 21 can be coupled with the second signal processing circuit 52. The signal processing circuits included in the processing device 210 can be coupled with low loss. The coupling between the conductive line and the signal processing circuit may include a connection. For example, the first conductive line 21 may be configured to be coupled with the first signal processing circuit 51. For example, second conductive line 22 may be configured to be coupled with the second signal processing circuit 52.

A first temperature of the first signal processing circuit 51 is different from a second temperature of the second signal processing circuit 52. By high thermal insulation of the transmission line 110, the temperature of these signal processing circuits is easily maintained at a desired state.

For example, the processing device 210 may be at least part of the quantum computer 310. In the processing device 210, efficient cooling is possible even when wiring for controlling a large number of quantum bits is provided, for example. For example, it is possible to provide a quantum computer that can operate with more bits than conventional ones. According to the embodiments, it is possible to provide a processing device (for example, a quantum computer) capable of improving characteristics.

In this example, the processing device 210 may include a cooling device 55. The second signal processing circuit 52 is provided in the cooling device 55. The first signal processing circuit 51 may be provided within the cooling device 55. For example, the cooling device 55 includes a cooling section 56. The second signal processing circuit 52 is provided in the cooling section 56. The first signal processing circuit 51 is provided outside the cooling section 56. By the operation of the cooling section 56, the second temperature of the second signal processing circuit 52 becomes lower than the first temperature of the first signal processing circuit 51. In one example, the difference between the first temperature and the second temperature is 100K or more. For example, in a low temperature environment of 77K or less, the difference between the first temperature and the second temperature may be 10K or more. In another example, the difference between the first temperature and the second temperature may be 0.1 K or more in a cryogenic environment of, for example, 1 K or less.

In this example, the second signal processing circuit 52 includes a second signal separator **52*b*, a processor 52*a*, and a second signal multiplexer 52*c*. For example, the first signal processing circuit 51 and the second signal separator 52*b* may be coupled by the first conductive line 21. The first signal processing circuit 51 and the second signal multiplexer 52*c* may be coupled by the third conductive line 23**.

In this example, a third signal processing circuit 53 and a fourth signal processing circuit 54 are further provided. For example, the third signal processing circuit 53 includes a third signal multiplexer **53*c*. For example, the fourth signal processing circuit 54 includes a fourth signal separator 54*b*. The third signal processing circuit 53 can be coupled with the first signal processing circuit 51. The fourth signal processing circuit 54 can be coupled with the first signal processing circuit 51**.

The embodiments may include the following configurations (e.g., Technical proposals):

Technical Proposal 1

A transmission line, comprising:

a first conductive line, at least a part of the first conductive line extending in a first direction;

a second conductive line electrically connected to the first conductive line, at least a part of the second conductive line extending along the first direction;

a first conductive layer;

a second conductive layer electrically connected to the first conductive layer, the second conductive layer including a first partial region, a second partial region, and a third partial region, a direction from the first partial region to the third partial region and a direction from the second partial region to the third partial region being along the first direction, the second conductive line being between the first conductive layer and the third partial region in a second direction crossing the first direction, the first conductive line being between the second partial region and the first partial region in a third direction crossing a plane including the first direction and the second direction; and a first conductive member including a first conductive region, at least a part of the first conductive line being between the first conductive layer and the first conductive region in the second direction, the first conductive member being electrically connected to the second conductive layer.

Technical Proposal 2

The transmission line according to Technical proposal 1, wherein a first gap is provided between the at least the part of the first conductive line and the first conductive region.

Technical Proposal 3

The transmission line according to Technical proposal 2, wherein a first distance along the second direction between the at least a part of the first conductive line and the first conductive region is longer than a second distance along the second direction between the first conductive layer and the first conductive line.

Technical Proposal 4

The transmission line according to Technical proposal 3, wherein the first distance is 5 times or more the second distance.

Technical Proposal 5

The transmission line according to Technical proposal 2, wherein a first distance along the second direction between the at least a part of the first conductive line and the first conductive region is longer than a third distance along the third direction between the first partial region and the first conductive line.

Technical Proposal 6

The transmission line according to Technical proposal 5, wherein the first distance exceeds the third distance.

Technical Proposal 7

The transmission line according to any one of Technical proposals 1-6, wherein the first conductive member further includes a first conductive portion and a second conductive portion, the first conductive portion electrically connects the first conductive region to the first partial region, the second conductive portion electrically connects the first conductive region to the second partial region, and a position of the first conductive line in the third direction is between a position of the second conductive portion in the third direction and a position of the first conductive portion in the third direction.

Technical Proposal 8

The transmission line according to Technical proposal 7, wherein the first conductive member further includes a third conductive portion, the third conductive portion electrically connects the first conductive region to the third partial region.

Technical Proposal 9

The transmission line according to any one of Technical proposals 1-8, wherein a position of the second conductive line in the second direction is between a position of the first conductive layer in the second direction and a position of the first conductive line in the second direction.

Technical Proposal 10

The transmission line according to any one of Technical proposals 1-9, further comprising:

a first insulating layer; and a second insulating layer, the first insulating layer being between the first conductive layer and the second conductive line in the second direction, and the second insulating layer being between the second conductive line and the first conductive line in the second direction.

Technical Proposal 11

The transmission line according to any one of Technical proposals 1-10, further comprising:

a first conductive connecting member electrically connecting the second conductive line to the first conductive line.

Technical Proposal 12

The transmission line according to Technical proposal 11, wherein the first conductive line includes a first region and a second region, the first region overlaps the first conductive region in the second direction, the second region does not overlap the first conductive region in the second direction, a part of the first region is electrically connected to the first conductive connecting member, and a first length along the first direction between the first conductive connecting member and a boundary between the first region and the second region is not less than 0.8 times and not more than 1.2 times ¼ of a wavelength of a signal propagating through the first conductive line.

Technical Proposal 13

The transmission line according to Technical proposal 7 or 8, further comprising:

a third conductive line, at least a part of the third conductive line extending along the first direction;

a fourth conductive line electrically connected to the third conductive line, at least a part of the fourth conductive line extending along the first direction; and a second conductive member including a second conductive region and a fourth conductive portion, the second conductive layer including a fourth partial region, a direction from the fourth partial region to the third partial region being along the first direction, the fourth conductive line being between the first conductive layer and the third partial region in the second direction, the third conductive line being between the fourth partial region and the second partial region in the third direction, at least a part of the third conductive line being between the first conductive layer and the second conductive region in the second direction, a second gap being provided between the at least the part of the third conductive line and the second conductive region, the fourth conductive portion electrically connecting the second conductive region to the fourth partial region, and a position of the third conductive line in the third direction being between a position of the fourth conductive portion in the third direction and a position of the second conductive portion in the third direction.

Technical Proposal 14

The transmission line according to Technical proposal 13, wherein the second conductive member further includes a fifth conductive portion, and the fifth conductive portion electrically connects the second conductive region to the third partial region.

Technical Proposal 15

The transmission line according to Technical proposal 13 or 14, wherein the second conductive member further includes a sixth conductive portion, the sixth conductive portion electrically connects the second conductive region to the second partial region, and the position of the third conductive line in the third direction is between the position of the fourth conductive portion in the third direction and a position of the sixth conductive portion in the third direction.

Technical Proposal 16

The transmission line according to Technical proposal 7 or 8, further comprising:

a third conductive line, at least a part of the third conductive line extending along the first direction; and a fourth conductive line electrically connected to the third conductive line, at least a part of the fourth conductive line extending along the first direction, the first conductive member further including a second conductive region and a fourth conductive portion, the second conductive layer including a fourth partial region, a direction from the fourth partial region to the third partial region being along the first direction, the fourth conductive line being between the first conductive layer and the third partial region in the second direction, the third conductive line being between the fourth partial region and the second partial region in the third direction, at least a part of the third conductive line being between the first conductive layer and the second conductive region in the second direction, a second gap being provided between the at least a part of the third conductive line and the second conductive region, the fourth conductive portion electrically connecting the second conductive region to the fourth partial region, and a position of the third conductive line in the third direction being between a position of the fourth conductive portion in the third direction and a position of the second conductive portion in the third direction.

Technical Proposal 17

The transmission line according to Technical proposal 11 or 12, wherein the first conductive line includes a first linear portion extending along the first direction, and a first connecting portion connected to the first conductive connecting member, and a width of the first connecting portion in the third direction is larger than a width of the first linear portion in the third direction.

Technical Proposal 18

The transmission line according to any one of Technical proposals 1-17, further comprising:

a first connecting member; and a second connection member, the first conductive layer including a first extending region along the first direction, and a plurality of first crossing regions, the plurality of first crossing regions being connected to the first extending region, a length of each of the plurality of first crossing regions in the third direction being longer than a length of the first extending region in the third direction, the second conductive layer including a second extending region along the first direction, and a plurality of second crossing regions, the plurality of second crossing regions being connected to the second extending region, a length of each of the plurality of second crossing regions in the third direction being longer than a length of the second extending region in the third direction, the first connecting member electrically connecting a part of one of the plurality of second crossing regions to a part of one of the plurality of first crossing regions, the second connecting member electrically connecting another part of the one of the plurality of second crossing regions to another part of the one of the plurality of first crossing region, a part of the second conductive line being between the first connecting member and the second connecting member in the third direction, and the part of the second conductive line being between the first extending region and the second extending region in the second direction.

Technical Proposal 19

A processing device, comprising:

the transmission line according to any one of Technical proposals 1-18;

a first signal processing circuit; and a second signal processing circuit, the first conductive line being configured to be coupled with the first signal processing circuit, and the second conductive line being configured to be coupled with the second signal processing circuit.

Technical Proposal 20

A quantum computer, comprising:

the transmission line according to any one of Technical proposals 1-18;

a first signal processing circuit; and a second signal processing circuit, the first conductive line being configured to be coupled with the first signal processing circuit, and the second conductive line being configured to be coupled with the second signal processing circuit.

According to the embodiments, it is possible to provide a transmission line, a processing device, and a quantum computer capable of improving characteristics.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the transmission lines such as conductive layers, conductive lines, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all transmission lines, all processing devices, and all quantum computers practicable by an appropriate design modification by one skilled in the art based on the transmission lines, the processing devices, and the quantum computers described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A transmission line, comprising:

a first conductive line, at least a part of the first conductive line extending in a first direction;

a second conductive line electrically connected to the first conductive line, at least a part of the second conductive line extending along the first direction;

a first conductive layer;

a second conductive layer electrically connected to the first conductive layer, the second conductive layer including a first partial region, a second partial region, and a third partial region, a direction from the first partial region to the third partial region and a direction from the second partial region to the third partial region being along the first direction, the second conductive line being between the first conductive layer and the third partial region in a second direction crossing the first direction, the first conductive line being between the second partial region and the first partial region in a third direction crossing a plane including the first direction and the second direction; and a first conductive member including a first conductive region, at least a part of the first conductive line being between the first conductive layer and the first conductive region in the second direction, the first conductive member being electrically connected to the second conductive layer.

2. The transmission line according to claim 1, wherein a first gap is provided between the at least the part of the first conductive line and the first conductive region.

3. The transmission line according to claim 2, wherein a first distance along the second direction between the at least a part of the first conductive line and the first conductive region is longer than a second distance along the second direction between the first conductive layer and the first conductive line.

4. The transmission line according to claim 3, wherein the first distance is 5 times or more the second distance.

5. The transmission line according to claim 2, wherein a first distance along the second direction between the at least a part of the first conductive line and the first conductive region is longer than a third distance along the third direction between the first partial region and the first conductive line.

6. The transmission line according to claim 5, wherein the first distance exceeds the third distance.

7. The transmission line according to claim 1, wherein the first conductive member further includes a first conductive portion and a second conductive portion, the first conductive portion electrically connects the first conductive region to the first partial region, the second conductive portion electrically connects the first conductive region to the second partial region, and a position of the first conductive line in the third direction is between a position of the second conductive portion in the third direction and a position of the first conductive portion in the third direction.

8. The transmission line according to claim 7, wherein the first conductive member further includes a third conductive portion, and the third conductive portion electrically connects the first conductive region to the third partial region.

9. The transmission line according to claim 1, wherein a position of the second conductive line in the second direction is between a position of the first conductive layer in the second direction and a position of the first conductive line in the second direction.

10. The transmission line according to claim 1, further comprising:

a first insulating layer; and a second insulating layer, the first insulating layer being between the first conductive layer and the second conductive line in the second direction, and the second insulating layer being between the second conductive line and the first conductive line in the second direction.

11. The transmission line according to claim 1, further comprising:

a first conductive connecting member electrically connecting the second conductive line to the first conductive line.

12. The transmission line according to claim 11, wherein the first conductive line includes a first region and a second region, the first region overlaps the first conductive region in the second direction, the second region does not overlap the first conductive region in the second direction, a part of the first region is electrically connected to the first conductive connecting member, and a first length along the first direction between the first conductive connecting member and a boundary between the first region and the second region is not less than 0.8 times and not more than 1.2 times ¼ of a wavelength of a signal propagating through the first conductive line.

13. The transmission line according to claim 7, further comprising:

a third conductive line, at least a part of the third conductive line extending along the first direction;

a fourth conductive line electrically connected to the third conductive line, at least a part of the fourth conductive line extending along the first direction; and a second conductive member including a second conductive region and a fourth conductive portion, the second conductive layer including a fourth partial region, a direction from the fourth partial region to the third partial region being along the first direction, the fourth conductive line being between the first conductive layer and the third partial region in the second direction, the third conductive line being between the fourth partial region and the second partial region in the third direction, at least a part of the third conductive line being between the first conductive layer and the second conductive region in the second direction, a second gap being provided between the at least the part of the third conductive line and the second conductive region, the fourth conductive portion electrically connecting the second conductive region to the fourth partial region, and a position of the third conductive line in the third direction being between a position of the fourth conductive portion in the third direction and a position of the second conductive portion in the third direction.

14. The transmission line according to claim 13, wherein the second conductive member further includes a fifth conductive portion, and the fifth conductive portion electrically connects the second conductive region to the third partial region.

15. The transmission line according to claim 13, wherein the second conductive member further includes a sixth conductive portion, the sixth conductive portion electrically connects the second conductive region to the second partial region, and the position of the third conductive line in the third direction is between the position of the fourth conductive portion in the third direction and a position of the sixth conductive portion in the third direction.

16. The transmission line according to claim 7, further comprising:

a third conductive line, at least a part of the third conductive line extending along the first direction; and a fourth conductive line electrically connected to the third conductive line, at least a part of the fourth conductive line extending along the first direction, the first conductive member further including a second conductive region and a fourth conductive portion, the second conductive layer including a fourth partial region, a direction from the fourth partial region to the third partial region being along the first direction, the fourth conductive line being between the first conductive layer and the third partial region in the second direction, the third conductive line being between the fourth partial region and the second partial region in the third direction, at least a part of the third conductive line being between the first conductive layer and the second conductive region in the second direction, a second gap being provided between the at least a part of the third conductive line and the second conductive region, the fourth conductive portion electrically connecting the second conductive region to the fourth partial region, and a position of the third conductive line in the third direction being between a position of the fourth conductive portion in the third direction and a position of the second conductive portion in the third direction.

17. The transmission line according to claim 11, wherein the first conductive line includes a first linear portion extending along the first direction, and a first connecting portion connected to the first conductive connecting member, and a width of the first connecting portion in the third direction is larger than a width of the first linear portion in the third direction.

18. The transmission line according to claim 1, further comprising:

a first connecting member; and a second connection member, the first conductive layer including a first extending region along the first direction, and a plurality of first crossing regions, the plurality of first crossing regions being connected to the first extending region, a length of each of the plurality of first crossing regions in the third direction being longer than a length of the first extending region in the third direction, the second conductive layer including a second extending region along the first direction, and a plurality of second crossing regions, the plurality of second crossing regions being connected to the second extending region, a length of each of the plurality of second crossing regions in the third direction being longer than a length of the second extending region in the third direction, the first connecting member electrically connecting a part of one of the plurality of second crossing regions to a part of one of the plurality of first crossing regions, the second connecting member electrically connecting another part of the one of the plurality of second crossing regions to another part of the one of the plurality of first crossing region, a part of the second conductive line being between the first connecting member and the second connecting member in the third direction, and the part of the second conductive line being between the first extending region and the second extending region in the second direction.

19. A processing device, comprising:

the transmission line according to claim 1;

a first signal processing circuit; and a second signal processing circuit, the first conductive line being configured to be coupled with the first signal processing circuit, and the second conductive line being configured to be coupled with the second signal processing circuit.

20. A quantum computer, comprising:

the transmission line according to claim 1;

a first signal processing circuit; and a second signal processing circuit, the first conductive line being configured to be coupled with the first signal processing circuit, and the second conductive line being configured to be coupled with the second signal processing circuit.

* * * * *